US012719730B2

(12) United States Patent
Liu et al.

(10) Patent No.: US 12,719,730 B2
(45) Date of Patent: Aug. 25, 2026

(54) APPROXIMATIONS IN DISTRIBUTION MATCHING PROCEDURES

(71) Applicant: QUALCOMM INCORPORATED, San Diego, CA (US)

(72) Inventors: Wei Liu, Beijing (CN); Thomas Joseph Richardson, South Orange, NJ (US); Liangming Wu, Beijing (CN); Changlong Xu, Beijing (CN); Hao Xu, Beijing (CN)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 18/833,331

(22) PCT Filed: Mar. 15, 2022

(86) PCT No.: PCT/CN2022/080854
§ 371 (c)(1),
(2) Date: Jul. 25, 2024

(87) PCT Pub. No.: WO2023/173273
PCT Pub. Date: Sep. 21, 2023

(65) Prior Publication Data
US 2025/0150320 A1 May 8, 2025

(51) Int. Cl.
*H04L 27/34* (2006.01)
*H04L 1/00* (2006.01)
(Continued)

(52) U.S. Cl.
CPC ........ *H04L 27/3405* (2013.01); *H04L 1/0042* (2013.01); *H04L 27/2602* (2013.01); *H04L 27/3483* (2013.01); *H04L 27/36* (2013.01)

(58) Field of Classification Search
CPC ............... H04L 27/3405; H04L 1/0042; H04L 27/2602; H04L 27/3483; H04L 27/36
See application file for complete search history.

(56) References Cited

U.S. PATENT DOCUMENTS 10,523,480 B1 * 12/2019 Gultekin ............... H04L 1/0042
10,749,554 B1 * 8/2020 Millar ....................... H04B 1/10
(Continued)

FOREIGN PATENT DOCUMENTS

CN 111628789 A 9/2020
CN 111669343 A 9/2020
WO WO-2020083491 A1 4/2020

OTHER PUBLICATIONS

International Search Report and Written Opinion—PCT/CN2022/080854—ISA/EPO—Nov. 30, 2022.
(Continued)

*Primary Examiner* — Freshteh N Aghdam
(74) *Attorney, Agent, or Firm* — Holland & Hart LLP

(57) ABSTRACT

Methods, systems, and devices for wireless communication are described. A wireless device may perform, on a set of information bits, a distribution matching procedure to obtain a distributed amplitude symbol sequence. In some cases, the wireless device may perform the distribution matching procedure using approximations of quantities of distributed amplitude symbol sequences that each have a same length and a same transmission energy. The wireless device may then encode the distributed amplitude symbol sequence and transmit the encoded distributed amplitude sequence. A device that receives the encoded distributed amplitude sequence may perform a distribution dematching procedure on the distributed amplitude sequence based on approximating quantities of distributed amplitude symbol sequences.

30 Claims, 21 Drawing Sheets

(51) Int. Cl.
*H04L 27/26* (2006.01)
*H04L 27/36* (2006.01)

(56) References Cited

U.S. PATENT DOCUMENTS

| | | | | |
|---|---|---|---|---|
| 2018/0083716 | A1* | 3/2018 | Cho | H04B 14/002 |
| 2021/0218607 | A1* | 7/2021 | Ait Aoudia | H04L 27/36 |
| 2024/0340209 | A1* | 10/2024 | Sayed Hassan | H04L 27/2636 |

OTHER PUBLICATIONS

ZTE: “Discussion on DL 1024QAM for NR FR1”, 3GPP TSG RAN WG1 #103-e, R1-2007977, 3rd Generation Partnership Project, Mobile Competence Centre, 650, Route Des Lucioles, F- 06921 Sophia-Antipolis Cedex, France, vol. RAN WG1, No. e-Meeting, Oct. 26, 2020-Nov. 13, 2020, Oct. 24, 2020, pp. 1-16, XP051946553, Nov. 13, 2020, Section 3, Part 3, Section 3, pp. 7 and 8, Figure 5.

Fehenberger T., et al., “Multiset-Partition Distribution Matching”, IEEE Transactions on Communications, IEEE Service Center, Piscataway, NjJ USA, vol. 67, No. 3, Mar. 1, 2019, pp. 1885-1893, XP011715038, Sections I, II, V.

Supplementary European Search Report—EP22931313—Search Authority—The Hague—Nov. 3, 2025.

* cited by examiner

800

1200

1400

APPROXIMATIONS IN DISTRIBUTION MATCHING PROCEDURES

CROSS REFERENCE

The present application is a 371 national stage filing of International PCT Application No. PCT/CN2022/080854 by Liu et al. entitled "APPROXIMATIONS IN DISTRIBUTION MATCHING PROCEDURES," filed Mar. 15, 2022, which is assigned to the assignee hereof, and which is expressly incorporated by reference in its entirety herein.

FIELD OF TECHNOLOGY

The following relates to wireless communication, including approximations in distribution matching procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support approximations in distribution matching procedures. For example, the described techniques provide for approximating quantities of distributed amplitude symbol sequences that each have a same length and a same transmission energy. In some systems, a wireless device (e.g., a user equipment (UE) or a network entity) may perform a distribution matching procedure to generate a distributed amplitude symbol sequences for a probabilistic amplitude shaping (PAS) scheme. To perform the distribution matching procedure, the wireless device may first determine approximations of quantities of distributed amplitude symbol sequences that each have a same length and a same transmission energy. Additionally, the wireless device may generate the distributed amplitude symbol sequence based on the determined approximations. The wireless device may encode the distributed amplitude symbol sequence and transmit the encoded distributed amplitude symbol sequence. A wireless device that receives the encoded distributed amplitude symbol sequence may also determine approximations of quantities of distributed amplitude symbol sequences that each have the same length and the same transmission energy. Additionally, the wireless device may perform a distribution dematching procedure based on the determined approximations.

A method for wireless communication at a first wireless device is described. The method may include determining, for a set of information bits, an approximation of a quantity of distributed amplitude symbol sequences that each have a same length and a same transmission energy, performing, on the set of information bits, a distribution matching procedure using the approximation of the quantity of distributed amplitude symbol sequences to obtain a distributed amplitude symbol sequence having the same length and the same transmission energy, encoding the distributed amplitude symbol sequence in accordance with a probabilistic constellation shaping scheme, and transmitting, to a second wireless device, the encoded distributed amplitude symbol sequence.

An apparatus for wireless communication at a first wireless device is described. The apparatus may include a processor, memory coupled with the processor, and instructions stored in the memory. The instructions may be executable by the processor to cause the apparatus to determine, for a set of information bits, an approximation of a quantity of distributed amplitude symbol sequences that each have a same length and a same transmission energy, perform, on the set of information bits, a distribution matching procedure using the approximation of the quantity of distributed amplitude symbol sequences to obtain a distributed amplitude symbol sequence having the same length and the same transmission energy, encode the distributed amplitude symbol sequence in accordance with a probabilistic constellation shaping scheme, and transmit, to a second wireless device, the encoded distributed amplitude symbol sequence.

Another apparatus for wireless communication at a first wireless device is described. The apparatus may include means for determining, for a set of information bits, an approximation of a quantity of distributed amplitude symbol sequences that each have a same length and a same transmission energy, means for performing, on the set of information bits, a distribution matching procedure using the approximation of the quantity of distributed amplitude symbol sequences to obtain a distributed amplitude symbol sequence having the same length and the same transmission energy, means for encoding the distributed amplitude symbol sequence in accordance with a probabilistic constellation shaping scheme, and means for transmitting, to a second wireless device, the encoded distributed amplitude symbol sequence.

A non-transitory computer-readable medium storing code for wireless communication at a first wireless device is described. The code may include instructions executable by a processor to determine, for a set of information bits, an approximation of a quantity of distributed amplitude symbol sequences that each have a same length and a same transmission energy, perform, on the set of information bits, a distribution matching procedure using the approximation of the quantity of distributed amplitude symbol sequences to obtain a distributed amplitude symbol sequence having the same length and the same transmission energy, encode the distributed amplitude symbol sequence in accordance with a probabilistic constellation shaping scheme, and transmit, to a second wireless device, the encoded distributed amplitude symbol sequence.

Some examples of the method, apparatuses, and non-transitory computer-readable medium described herein may further include operations, features, means, or instructions for identifying the same transmission energy based on the set of information bits, where determining the approximation may be based on identifying the same transmission energy.

In some examples of the method, apparatuses, and non-transitory computer-readable medium described herein, performing the distribution matching procedure may include operations, features, means, or instructions for identifying, using the approximation of the quantity of distributed amplitude symbol sequences and based on identifying the same transmission energy, second quantities of each symbol from a set of symbols in the distributed amplitude symbol sequence, where the distributed amplitude symbol sequence may be obtained based on identifying the second quantities of each of the set of symbols.

Some examples of the method, apparatuses, and non-transitory computer-readable medium described herein may further include operations, features, means, or instructions for determining, for each symbol in the distributed amplitude symbol sequence using the approximation of the quantity of distributed amplitude symbol sequences and based on identifying the same transmission energy, a transition probability that may be associated with a probabilistic constellation shaping scheme, where performing the distribution matching procedure may be based on the transition probability for each symbol.

In some examples of the method, apparatuses, and non-transitory computer-readable medium described herein, determining the transition probability may include operations, features, means, or instructions for determining a set of logarithmic approximations of quantities of distributed amplitude symbol sequences, the set of logarithmic approximations including at least the approximation of the quantity of distributed amplitude symbol sequences that each may have the same length and the same transmission energy, determining a set of exponentiation values each corresponding to one of the set of logarithmic approximations, and normalizing each exponentiation value in the set of exponentiation values.

In some examples of the method, apparatuses, and non-transitory computer-readable medium described herein, each of the quantity of distributed amplitude symbol sequences includes symbols from a set of symbols and determining the approximation of the quantity of distributed amplitude symbol sequences may be based on a second quantity of symbols in the set of symbols.

In some examples of the method, apparatuses, and non-transitory computer-readable medium described herein, determining the approximation of the quantity of distributed amplitude symbol sequences may include operations, features, means, or instructions for determining a logarithmic approximation of the quantity of distributed amplitude symbol sequences.

Some examples of the method, apparatuses, and non-transitory computer-readable medium described herein may further include operations, features, means, or instructions for identifying, based on the same length of each of the quantity of distributed amplitude symbol sequences, a portion of the same transmission energy associated with each symbol in the distributed amplitude symbol sequences and applying a set of multiple functions to the identified portion of the same transmission energy, where determining the approximation may be based on applying the set of multiple functions.

In some examples of the method, apparatuses, and non-transitory computer-readable medium described herein, applying the set of multiple functions may include operations, features, means, or instructions for applying, to the portion of the same transmission energy, a first function that may be scaled by the same length of each of the quantity of distributed amplitude symbol sequences, applying, to the portion of the same transmission energy, a second function that may be based on a logarithmic value of the same length of each of the quantity of distributed amplitude symbol sequences, and applying, to the portion of the same transmission energy, a third function that may be scaled by an inverse of the same length of each of the quantity of distributed amplitude symbol sequences.

Some examples of the method, apparatuses, and non-transitory computer-readable medium described herein may further include operations, features, means, or instructions for applying a second function to the same transmission energy, where determining the approximation may be based on applying the second function to the same transmission energy.

In some examples of the method, apparatuses, and non-transitory computer-readable medium described herein, applying the set of multiple functions may include operations, features, means, or instructions for applying, over a first duration, a first function to the portion of the same transmission energy and applying a second function to the portion of the same transmission energy over a second duration that at least partially overlaps with the first duration.

Some examples of the method, apparatuses, and non-transitory computer-readable medium described herein may further include operations, features, means, or instructions for transmitting, to the second wireless device, signaling indicating one or more parameters associated with approximating the quantity of distributed amplitude symbol sequences, where transmitting the encoded distributed amplitude symbol sequence may be based on transmitting the signaling.

In some examples of the method, apparatuses, and non-transitory computer-readable medium described herein, the one or more parameters include a modulation order associated with each of the quantity of distributed amplitude symbol sequences, the same transmission energy of each of the quantity of distributed amplitude symbol sequences, or both.

Some examples of the method, apparatuses, and non-transitory computer-readable medium described herein may further include operations, features, means, or instructions for receiving, from the second wireless device, signaling requesting one or more parameters associated with approximating the quantity of distributed amplitude symbol sequences, where transmitting the encoded distributed amplitude symbol sequence may be based on receiving the signaling.

In some examples of the method, apparatuses, and non-transitory computer-readable medium described herein, the distributed amplitude symbol sequence includes a non-uniform probability distribution of amplitudes that may be based on a predefined probability distribution of amplitudes.

Some examples of the method, apparatuses, and non-transitory computer-readable medium described herein may further include operations, features, means, or instructions for performing, in accordance with a probabilistic constellation shaping scheme, a modulation procedure on the encoded distributed amplitude symbol sequence to obtain the codeword, where transmitting the codeword may be based on performing the modulation procedure.

A method for wireless communication at a first wireless device is described. The method may include receiving, from a second wireless device, an encoded distributed amplitude symbol sequence, decoding the encoded distributed amplitude symbol sequence in accordance with a probabilistic constellation shaping scheme, determining an approximation of a quantity of distributed amplitude symbol sequences that each have a same length as the distributed amplitude symbol sequence and a same transmission energy as the distributed amplitude symbol sequence, and performing, on the distributed amplitude symbol sequence, a distribution dematching procedure using the approximation of the quantity of distributed amplitude symbol sequences to obtain a set of information bits.

An apparatus for wireless communication at a first wireless device is described. The apparatus may include a processor, memory coupled with the processor, and instructions stored in the memory. The instructions may be executable by the processor to cause the apparatus to receive, from a second wireless device, an encoded distributed amplitude symbol sequence, decode the encoded distributed amplitude symbol sequence in accordance with a probabilistic constellation shaping scheme, determine an approximation of a quantity of distributed amplitude symbol sequences that each have a same length as the distributed amplitude symbol sequence and a same transmission energy as the distributed amplitude symbol sequence, and perform, on the distributed amplitude symbol sequence, a distribution dematching procedure using the approximation of the quantity of distributed amplitude symbol sequences to obtain a set of information bits.

Another apparatus for wireless communication at a first wireless device is described. The apparatus may include means for receiving, from a second wireless device, an encoded distributed amplitude symbol sequence, means for decoding the encoded distributed amplitude symbol sequence in accordance with a probabilistic constellation shaping scheme, means for determining an approximation of a quantity of distributed amplitude symbol sequences that each have a same length as the distributed amplitude symbol sequence and a same transmission energy as the distributed amplitude symbol sequence, and means for performing, on the distributed amplitude symbol sequence, a distribution dematching procedure using the approximation of the quantity of distributed amplitude symbol sequences to obtain a set of information bits.

A non-transitory computer-readable medium storing code for wireless communication at a first wireless device is described. The code may include instructions executable by a processor to receive, from a second wireless device, an encoded distributed amplitude symbol sequence, decode the encoded distributed amplitude symbol sequence in accordance with a probabilistic constellation shaping scheme, determine an approximation of a quantity of distributed amplitude symbol sequences that each have a same length as the distributed amplitude symbol sequence and a same transmission energy as the distributed amplitude symbol sequence, and perform, on the distributed amplitude symbol sequence, a distribution dematching procedure using the approximation of the quantity of distributed amplitude symbol sequences to obtain a set of information bits.

Some examples of the method, apparatuses, and non-transitory computer-readable medium described herein may further include operations, features, means, or instructions for identifying the same transmission energy based on the distributed amplitude symbol sequence, where determining the approximation may be based on identifying the same transmission energy.

In some examples of the method, apparatuses, and non-transitory computer-readable medium described herein, performing the distribution dematching procedure may include operations, features, means, or instructions for identifying, using the approximation of the quantity of distributed amplitude symbol sequences and based on identifying the same transmission energy, second quantities of each symbol from a set of symbols in the distributed amplitude symbol sequence, where the set of information bits may be obtained based on identifying the second quantities of each of the set of symbols.

Some examples of the method, apparatuses, and non-transitory computer-readable medium described herein may further include operations, features, means, or instructions for determining, for each symbol in the distributed amplitude symbol sequence using the approximation of the quantity of distributed amplitude symbol sequences and based on identifying the same transmission energy, a transition probability that may be associated with a probabilistic constellation shaping scheme, where performing the distribution dematching procedure may be based on the transition probability for each symbol.

In some examples of the method, apparatuses, and non-transitory computer-readable medium described herein, determining the transition probability may include operations, features, means, or instructions for determining a set of logarithmic approximations of quantities of distributed amplitude symbol sequences, the set of logarithmic approximations including at least the approximation of the quantity of distributed amplitude symbol sequences that each may have the same length as the distributed amplitude symbol sequence and the same transmission energy as the distributed amplitude symbol sequence, determining a set of exponentiation values each corresponding to one of the set of logarithmic approximations, and normalizing each exponentiation value in the set of exponentiation values.

In some examples of the method, apparatuses, and non-transitory computer-readable medium described herein, each of the quantity of distributed amplitude symbol sequences includes symbols from a set of symbols and determining the approximation of the quantity of distributed amplitude symbol sequences may be based on a second quantity of symbols in the set of symbols.

In some examples of the method, apparatuses, and non-transitory computer-readable medium described herein, determining the approximation of the quantity of distributed amplitude symbol sequences may include operations, features, means, or instructions for determining a logarithmic approximation of the quantity of distributed amplitude symbol sequences.

Some examples of the method, apparatuses, and non-transitory computer-readable medium described herein may further include operations, features, means, or instructions for identifying, based on the same length of each of the quantity of distributed amplitude symbol sequences, a portion of the same transmission energy associated with each symbol in the distributed amplitude symbol sequences and applying a set of multiple functions to the identified portion of the same transmission energy, where determining the approximation may be based on applying the set of multiple functions.

In some examples of the method, apparatuses, and non-transitory computer-readable medium described herein, applying the set of multiple functions may include operations, features, means, or instructions for applying, to the portion of the same transmission energy, a first function that may be scaled by the same length of each of the quantity of distributed amplitude symbol sequences, applying, to the portion of the same transmission energy, a second function that may be based on a logarithmic value of the same length of each of the quantity of distributed amplitude symbol sequences, and applying, to the portion of the same transmission energy, a third function that may be iterative and scaled by an inverse of the same length of each of the quantity of distributed amplitude symbol sequences.

Some examples of the method, apparatuses, and non-transitory computer-readable medium described herein may further include operations, features, means, or instructions for applying a second function to the same transmission energy, where determining the approximation may be based on applying the second function to the same transmission energy.

In some examples of the method, apparatuses, and non-transitory computer-readable medium described herein, applying the set of multiple functions may include operations, features, means, or instructions for applying, over a first duration, a first function to the portion of the same transmission energy and applying a second function to the portion of the same transmission energy over a second duration that at least partially overlaps with the first duration.

Some examples of the method, apparatuses, and non-transitory computer-readable medium described herein may further include operations, features, means, or instructions for receiving, from the second wireless device, signaling indicating one or more parameters associated with approximating the quantity of distributed amplitude symbol sequences, where receiving the encoded distributed amplitude symbol sequence may be based on receiving the signaling.

In some examples of the method, apparatuses, and non-transitory computer-readable medium described herein, the one or more parameters include a modulation order associated with each of the quantity of distributed amplitude symbol sequences, the same transmission energy of each of the quantity of distributed amplitude symbol sequences, or both.

Some examples of the method, apparatuses, and non-transitory computer-readable medium described herein may further include operations, features, means, or instructions for transmitting, to the second wireless device, signaling requesting one or more parameters associated with approximating the quantity of distributed amplitude symbol sequences, where receiving the encoded distributed amplitude symbol sequence may be based on transmitting the signaling.

In some examples of the method, apparatuses, and non-transitory computer-readable medium described herein, the distributed amplitude symbol sequence includes a non-uniform probability distribution of amplitudes that may be based on a predefined probability distribution of amplitudes.

DETAILED DESCRIPTION

In some wireless communications system, a wireless device (e.g., a user equipment (UE), a network entity) may use a probabilistic amplitude shaping (PAS) scheme to obtain a distributed amplitude symbol sequence (e.g., to obtain a symbol sequence with a non-uniform distribution of each constellation symbol amplitude). For example, the wireless device may perform a distribution matching procedure on a set of information bits to generate the distributed amplitude symbol sequence. To perform the distribution matching procedure to generate a distributed amplitude symbol sequence, a wireless device may perform calculations that rely on determining quantities of symbol sequences that each have a same length and a same transmission energy. In some cases, however, determining the quantity of symbol sequences that each have a same length and a same transmission energy may be computationally complex, thus leading to processing delays introduced when a wireless device generates distributed amplitude symbol sequences.

To decrease a computational complexity and improve a processing speed for a wireless device performing a distribution matching procedure, the wireless device may determine approximations of the quantities of distributed amplitude symbol sequences that each have a same length and a same transmission energy (e.g., instead of determining the actual quantities of symbol sequences). Here, the wireless device may obtain a distributed amplitude symbol sequence based on performing a distribution matching procedure on a set of information bits using the approximation of quantities of symbol sequences that each have a same length and a same transmission energy.

In some cases, a wireless device that receives a distributed amplitude symbol sequence may perform a distribution dematching procedure on the received distribution amplitude symbol sequence to obtain a set of information bits. The distribution dematching procedure may also rely on determining quantities of symbol sequences that each have a same length and a same transmission energy. In order to similarly decrease the computational complexity and improve the processing speed for a wireless device performing a distribution dematching procedure, the wireless device may determine approximations of the quantities of symbol sequences that each have a same length and a same transmission energy (e.g., instead of determining the actual quantities of symbol sequences).

Aspects of the disclosure are initially described in the context of wireless communications systems. Aspects of the disclosure are then described in the context of PAS processes, flowcharts, and a process flow. Aspects of the disclosure are further illustrated by and described with reference to apparatus diagrams, system diagrams, and flowcharts that relate to approximations in distribution matching procedures.

Figure 1:
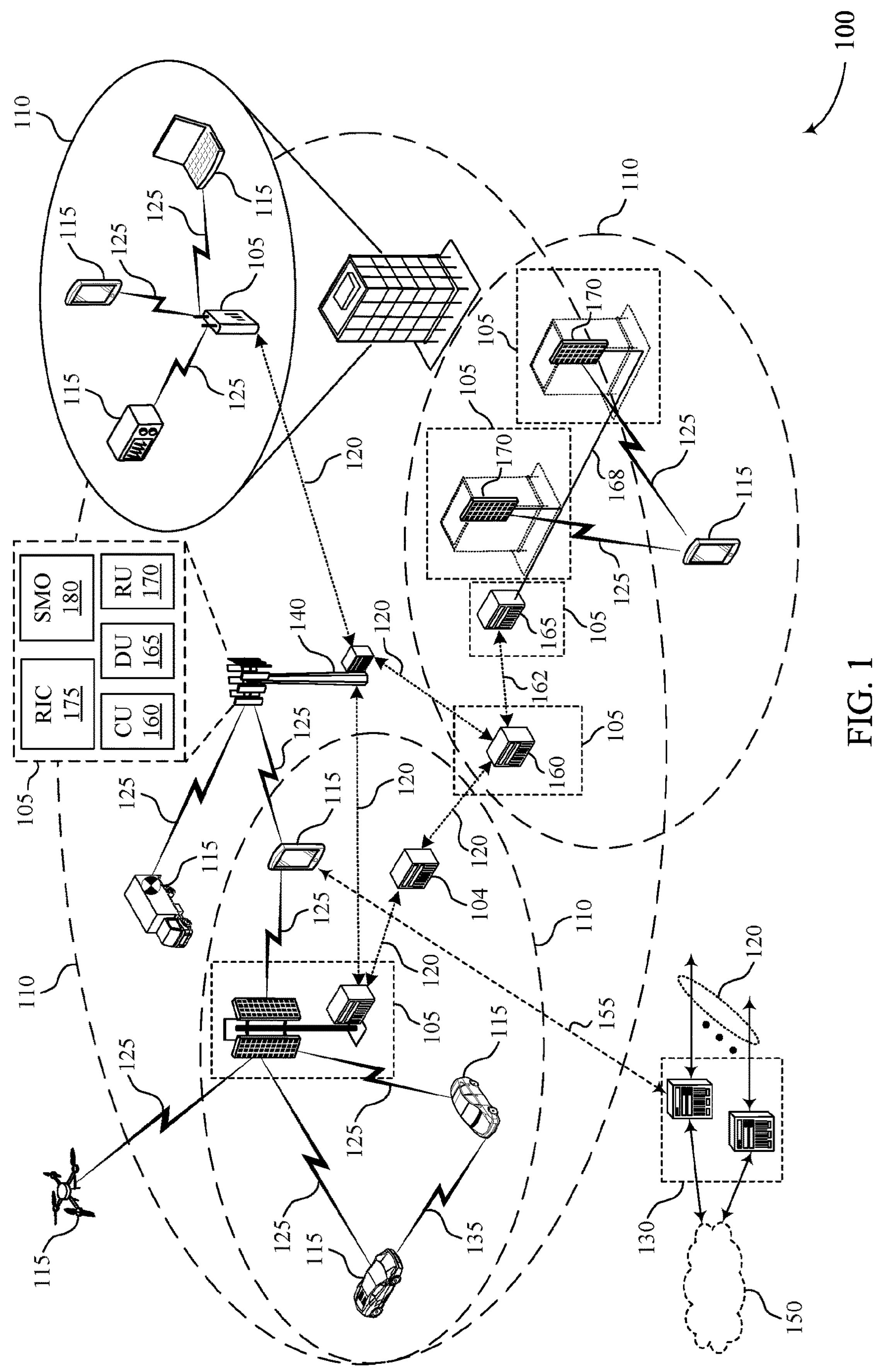
FIGS. 1 and 2 illustrate examples of wireless communications systems that support approximations in distribution matching procedures in accordance with one or more aspects of the present disclosure.

FIG. 1 illustrates an example of a wireless communications system 100 that supports approximations in distribution matching procedures in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support approximations in distribution matching procedures as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the “device” may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term “carrier” may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below: 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems 100, wireless devices (e.g., network entities 105, UEs 115) may rely on higher-order modulation schemes (e.g., 16 quadrature amplitude modulation (QAM), 64 QAM, 256 QAM). A constellation generated using these higher-order modulation schemes may be fixed and each constellation point may be used with equal probability. Additionally, over an additive white Gaussian noise (AWGN) channel, a capacity may be achievable if an input distribution is a Gaussian distribution. Here, a shaping gap may correspond to a difference between a signal-to-noise ratio (SNR) to achieve a rate with a defined coding and modulation scheme and the SNR associated with an optimal capacity-achieving scheme operating at the same rate. Additionally, the shaping gap may be asymptotically equal to 1.53 dB for a relatively large rate. In some cases, techniques to reduce or close the shaping gap may include geometric shaping and probabilistic shaping. Geometric shaping may implement equiprobably signaling with Gaussian-like distributed constellation points. Additionally, probabilistic shaping may employ equidistant constellation points and may implement non-uniform (e.g., Gaussian-like) signal distribution.

In wireless communications system 100, a wireless device (e.g., a network entity 105, a UE 115) may use probabilistic shaping to obtain non-uniformly distributed constellations. For example, the wireless device may use trellis shaping or shell mapping. In some cases, the wireless device may use PAS scheme to obtain a distributed amplitude symbol sequence (e.g., to obtain a symbol sequence with a non-uniform distribution of each constellation symbol amplitude). In some cases, a PAS scheme may combine an outer layer of shaping with an inner layer of binary forward error correction (FEC), which may enable low complexity and flexible integration with some bit-interleaved coded modulation (BICM) schemes. Additionally, a PAS scheme may provide a relatively large shaping gain and inherent rate adaptation functionality.

In some cases, the wireless device (e.g., a network entity 105, a UE 115) may use probabilistic shaping to obtain non-uniformly distributed constellations. For example, the wireless device may perform a distribution matching procedure on a set of information bits to generate the distributed amplitude symbol sequence. To perform the distribution matching procedure to generate a distributed amplitude symbol sequence, a wireless device may perform calculations that rely on determining a quantity of symbol sequences that each have a same length and a same transmission energy as the generated distributed amplitude symbol sequence. In some cases, however, determining the quantity of symbol sequences that each have a same length and a same transmission energy as the generated distributed amplitude symbol sequence may be computationally complex, thus leading to processing delays introduced when a wireless device generates distributed amplitude symbol sequences.

To decrease a computational complexity and improve a processing speed for a wireless device performing a distribution matching procedure, the wireless device may determine an approximation of the quantity of distributed amplitude symbol sequences that each have a same length and a same transmission energy as the generated distributed amplitude symbol sequence (e.g., instead of determining the actual quantity of symbol sequences). Here, the wireless device may obtain a distributed amplitude symbol sequence based on performing a distribution matching procedure on a set of information bits using the approximation of the quantity of symbol sequences that each have a same length and a same transmission energy as the generated distributed amplitude symbol sequence.

In some cases, a wireless device that receives a distributed amplitude symbol sequence may perform a distribution dematching procedure on the received distribution amplitude symbol sequence to obtain a set of information bits. The distribution dematching procedure may also rely on determining a quantity of symbol sequences that each have a same length and a same transmission energy as the generated distributed amplitude symbol sequence. In order to similarly decrease the computational complexity and improve the processing speed for a wireless device performing a distribution dematching procedure, the wireless device may determine an approximation of the quantity of symbol sequences that each have a same length and a same transmission energy as the received distributed amplitude symbol sequence (e.g., instead of determining the actual quantity of symbol sequences).

Figure 2:
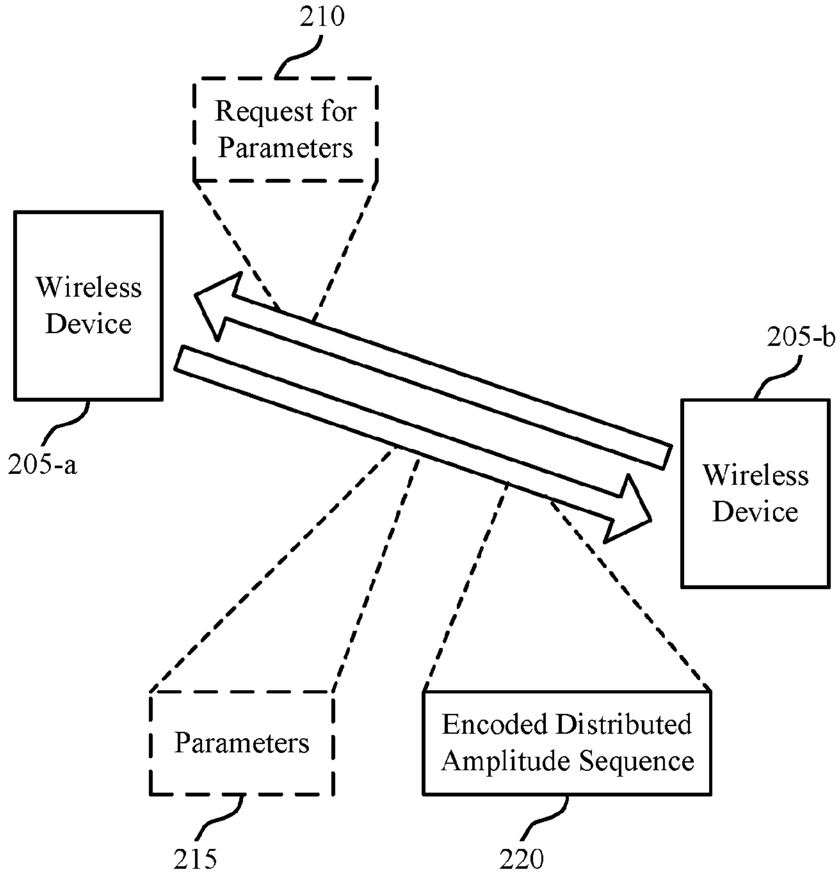

FIG. 2 illustrates an example of a wireless communications system 200 that supports approximations in distribution matching procedures in accordance with one or more aspects of the present disclosure. The wireless communications system 200 may be an example of a wireless communications system 100 as described with reference to FIG. 1. For example, the wireless communications system 200 may include wireless devices 205, which may be examples of a UE 115 or a network entity 105 as described with reference to FIG. 1. The wireless devices 205 may communicate information (e.g., sets of information bits) via encoded distributed amplitude sequences 220, which may be generated according to a PAS scheme. Additionally, the wireless devices 205 may use approximations of quantities of distributed amplitude symbol sequences that each have a same length and same transmission energy to perform distribution matching and dematching procedures associated with transmitting and receiving the encoded distributed amplitude sequence 220, respectively.

In some cases, prior to communicating information using encoded distributed amplitude sequences 220, the wireless devices 205 may exchange signaling to ensure synchronization between the wireless devices 205. For example, the wireless device 205-*b* may transmit the parameters 215 to the wireless device 205-*b* prior to transmitting the encoded distributed amplitude sequence 220 to the wireless device 205-*b*. The parameters 215 may include a modulation order associated with the encoded distributed amplitude sequence 220, a transmission energy associated with the encoded distributed amplitude sequence 220, or both. In some examples, the wireless device 205-*b* may transmit a request 210 for the parameters to the wireless device 205-*a*. Here, the wireless device 205-*a* may transmit the parameters 215 to the wireless device 205-*b* in response to receiving the request 210 for the parameters from the wireless device 205-*b*.

Based on transmitting the parameters 215, the wireless device 205-*a* may perform a distribution matching procedure on a set of information bits to generate the distributed amplitude symbol sequence 220. In some cases, the wireless device 205-*a* may performing the distribution matching procedure using an approximation of a quantity of distributed amplitude symbol sequences. For example, the wireless device 205-*a* may determine the approximation of the quantity of distributed amplitude symbol sequences that each have a same length as the distributed amplitude symbol sequence 220 and a same transmission energy as the distributed amplitude symbol sequences 220 (e.g., as indicated by the parameters 215). The wireless device 205-*a* may then encode the distributed amplitude symbol sequence 220 (e.g., to generate an encoded distributed amplitude symbol sequence 220), modulate the encoded distributed amplitude symbol sequence 220 (e.g., to generate a codeword including the encoded distributed amplitude symbol sequence 220), and transmit the distributed amplitude symbol sequence 220 (e.g., within a codeword).

The wireless device 205-*b* may receive the distributed amplitude symbol sequence 220 (e.g., within the codeword), demodulate the codeword (e.g., to obtain the encoded distributed amplitude symbol sequence 220), and decode the encoded distributed amplitude symbol sequence 220. Then, the wireless device 205-*b* may perform a distribution dematching procedure to obtain the set of information bits. The wireless device 205-*b* may perform the distribution dematching procedure based on an approximation of the quantity of distributed amplitude symbol sequences that each have the same length as the distributed amplitude symbol sequence 220 and a same transmission energy as the distributed amplitude symbol sequence 220 (e.g., as indicated by the parameters 215).

Figure 3:
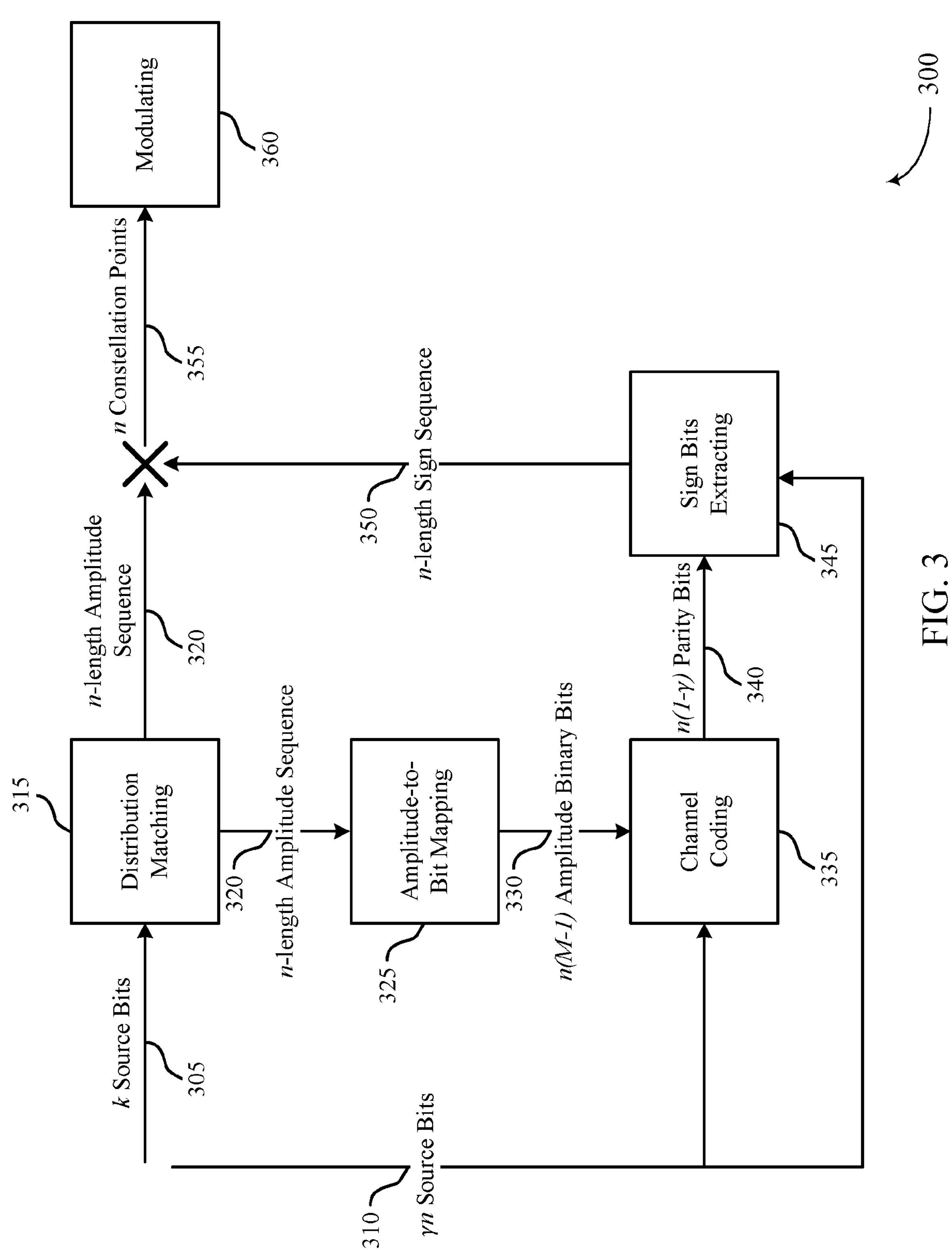
FIGS. 3 and 4 illustrate examples of probabilistic amplitude shaping (PAS) processes that support approximations in distribution matching procedures in accordance with one or more aspects of the present disclosure.

FIG. 3 illustrates an example of a PAS process 300 that supports approximations in distribution matching procedures in accordance with one or more aspects of the present disclosure. The PAS process 300 may be performed by a wireless device, such as a UE 115 or a network entity 105, in a wireless communications system described with reference to FIGS. 1 and 2. In some examples, the wireless device may perform the PAS process 300 to generate a set of non-uniformly distributed symbols for transmission. As described herein, at 315 the wireless device may perform a distribution matching procedure using an approximation of quantities of distributed amplitude symbol sequences that each have a same length and a same transmission energy.

At 305, the wireless device may determine a set of k source bits. The k source bits 305 may represent a portion of a set of information bits to send to another wireless device. At 310, the wireless device may determine a set of $\gamma$n source bits, which may also represent a set of information bits to send to another wireless device and may be included in the set of information bits to send to another wireless device. In some cases, the k source bits 305 may be independent and identically distributed with a uniform distribution.

At 315, the wireless device may perform a distribution matching procedure to obtain an n-length amplitude sequence 320 from k source bits 305. The distribution matching procedure may be configured (e.g., pre-configured, dynamically configured) for a specific non-uniform distribution. For example, the n-length amplitude sequence 320 may be a non-uniform amplitude sequence supporting non-uniform symbol amplitude mapping, as described herein.

In some cases, the n-length amplitude sequence 320 may be a distributed amplitude symbol sequence including symbols from an amplitude alphabet $\mathcal{A}=\{1, 3, \ldots, 2^M-1\}$. Additionally, performing the distribution matching procedure at 315 may generate $2^M$ array amplitudes (e.g., including each amplitude sequence of the n-length amplitude sequence 320) which include an amplitude shifting keying (ASK) constellation $\{\pm1, \pm3, \ldots, \pm(2^M-1)\}$. In this case, a distribution matching rate $R_{dm}$ may be defined according to Equation 1:

$$R_{dm} = \frac{k}{n}. \tag{1}$$

In some cases, the distribution matching procedure may be a fixed-to-fixed distribution matching procedure that maps the k source bits 305 to the n-length amplitude sequence 320 and induces a non-uniform marginal distribution over the amplitude symbols $\{1, 3, \ldots, 2^M-1\}$. Here, the non-uniform distribution over the n-length amplitude sequence 320 obtained by performing the distribution matching procedure at 315 may be closer to a capacity-achieving distribution as compared to the a uniformly distributed amplitude sequence. That is, the n-length amplitude sequence 320 may be closer to a Gaussian-like or Maxwell-Boltzmann distribution in an AWGN setting as compared to a uniformly distributed amplitude sequence. In some cases, Maxwell-Boltzmann distributions may be associated with a symmetric probability distribution as defined according to Equation 2:

$$p_v(x) = \frac{1}{z_v}e^{-vx^2}, \tag{2}$$

where $x\in\{\pm1, \pm3, \ldots, \pm(2^M-1)\}$. In some cases, the symmetric probability distribution defined by Equation 2 may correspond to a Maxwell-Boltzmann distribution for amplitudes (e.g., for the n-length amplitude sequence 320).

In some cases, however, an optimal Maxwell-Boltzmann distributed input (e.g., to a distribution matching procedure) may result in a shaping gain over a uniformly distributed input over an ASK constellation (e.g., a uniformly distributed amplitude sequence). Thus, the wireless device may instead rely on sphere shaping to generate the n-length amplitude sequence 320. A sphere shaping scheme may identify $2^k$ symbol sequences of length with a least amount of energy (e.g., transmission energy). Then, a wireless device performing a distribution matching procedure according to a sphere shaping scheme may map each of the k source bits 305 to an n-length amplitude sequence 320 one-to-one.

In some instances, distribution matching procedures that rely on a sphere shaping scheme may utilize sequences associated with the least transmission energy. Additionally, a distribution of n-length amplitude sequences 320 generated using a sphere shaping scheme may be associated with a marginal distribution that is similar to a Maxwell-Boltzmann distribution. Additionally, n-length amplitude sequences 320 generated using a sphere shaping scheme may be associated with a near optimal shaping gain and a decreased energy use for a given rate (e.g., when compared to other shaping schemes).

In some cases, however, distribution matching procedures that rely on a sphere shaping scheme may be associated with a large computational and storage complexity. Specifically, a wireless device performing a distribution matching procedure associated with a sphere shaping scheme may rely on a computation of a totally quantity N of n-length amplitude sequences having the length n and a same transmission energy E as the n-length amplitude sequence. That is, for an alphabet $\mathcal{A}_m$, where m is an integer greater than one that corresponds to a size of the alphabet $\mathcal{A}_m$, the alphabet $\mathcal{A}_m=\{a_1, a_2, \ldots, a_m\}$. Additionally, the alphabet $\mathcal{A}_m$ may be associated with an ordering, where $a_i<a_{i+1}$ for each i, i.e., $a_1<a_2<\ldots<a_m$. In this case, an energy of the alphabet $E_i$ may be defined according to Equation 3:

$$E_i = E(a_i), \tag{3}$$

where $a_i$ may correspond to a symbol in the alphabet $\mathcal{A}_m$, $i\in\{1, 2, \ldots, m\}$, and $E(a_i)$ maps each symbol to an energy $E_i$ an energy for each symbol. Additionally, the symbol energies may be associated with an energy behavior defined according to Equation 4:

$$0 \le E(a_i) < E(a_{i+1}), \tag{4}$$

where $i\in\{1, 2, \ldots, m-1\}$. In some cases (e.g., for ASK constellations), $m=2^{M-1}$ and $\{-1, 1\}\times\mathcal{A}_m$ corresponds to a $2^M$ array associated with an ASK alphabet, which may be based on m corresponding to a modulation order. Here, each symbol $a_i$ may be defined according to Equation 5:

$$a_i = 2i - 1. \quad (5)$$

Additionally, the energy for each symbol $a_i$ may be defined according to either Equations 6 or 7:

$$E(a_i) = (2i-1)^2, \quad (6)$$

$$E(a_i) = \frac{i(i-1)}{2}. \quad (7)$$

In the case of either Equations 6 or 7, since $8E(a_i)+1=(2i-1)^2$, $E(a_i)$ may involve a rescaling of $(2i-1)^2$. Additionally, given an alphabet $\mathcal{A}_m$ of size m, consider a sequence $s=(s_1, s_2, \ldots, s_n)$, where each element of s takes values in $\mathcal{A}_m$.

In some cases, an energy of the sequence s may correspond to E(s) and be defined according to Equation 8:

$$E(s) = \sum_{i=1}^{n} E(s_i), \quad (8)$$

where E(s) corresponds to a summation of all symbol energies. Additionally, the prefix $$s_1^t$$

may correspond to $(s_1, s_2, \ldots, s_t)$. Here, s may correspond to $$s_1^n.$$

In this example, the energy of the prefix $$E(s_1^t)$$

may be defined according to Equation 9:

$$E(s_1^t) = \sum_{i=1}^{t} E(s_i). \quad (9)$$

In some cases, $N^{[m]}(n, E)$ may correspond to a total quantity of sequences N associated with the alphabet $\mathcal{A}_m$ that have a same length n and a same transmission energy E. Here, the value of $N^{[m]}(n, E)$ may be based on values of the size m of the alphabet $\mathcal{A}_m$, the length n, and the transmission energy E. Additionally, $\{s=(s_1, s_2, \ldots, s_n) | s_i \in \mathcal{A}_m, \forall i, E(s)=E\}$ may correspond to a set of sequences associated with the alphabet $\mathcal{A}_m$ that have the length n and the transmission energy E, where $N^{[m]}(n, E)$ may be a cardinality of the set of the sequences.

In some cases, determining the value of $N^{[m]}(n, E)$ may include multinomial coefficients associated with the transmission energy E, which may be computationally complex to determine. Additionally, some wireless devices may rely on recursive algorithms to compute the value of $N^{[m]}(n, E)$, which may also be associated with a high computational complexity and a larger amount of time to perform that computation. That is, the complexity of determining a value of $N^{[m]}(n, E)$ may be a same complexity as a quadratic in n. For example, a magnitude of N(200, 500) may be larger than $3\times10^{118}$ for the alphabet $\mathcal{A}_4=\{0, 1, 3, 6\}$. In examples of delay sensitive applications (e.g., constellation shaping), these high complexity calculations may negatively impact a performance of the wireless device. Thus, in the example of the PAS process 300, the wireless device may approximate a value of $N^{[m]}(n, E)$, which may be associated with decreased computational complexity when compared to calculating a value of $N^{[m]}(n, E)$.

In some cases, a wireless device may utilize an approximation formula to determine an approximation of $N^{[m]}(n, E)$, where the approximation may be denoted by $\hat{N}^{[m]}(n, E)$. The wireless device may perform the approximation in a logarithmic domain (e.g., by identifying a $\log \hat{N}^{[m]}(n, E)$ or an $\ln \hat{N}^{[m]}(n, E)$). Additionally, the approximation formula may include a summation of a set of functions where the domain of each function depends on the size m of the alphabet $\mathcal{A}_m$. Additionally, the domain of each function in the approximation formula may contain either the energy E or a normalization of the energy E, ω. The normalized transmission energy ω may be defined according to Equation 10:

$$\omega = \frac{E}{n}. \quad (10)$$

Additionally, the summation of the set of functions for the approximation formula may include at least one function that is scaled (e.g., multiplied) by the length n of the n-length amplitude sequence 320 and at least one function that depends logarithmically on n. Additionally, the summation of the set of functions for the approximation formula may include a series of functions, each of which may be scaled by a factor that is inversely proportional to a power of n.

In an example where the alphabet $\mathcal{A}_m$ includes two symbols (e.g., m=2 and the alphabet $\mathcal{A}_m=\mathcal{A}_2$), $a_1$ may equal 0 and $a_2$ may equal 1. That is, $\mathcal{A}_2=\{0, 1\}$ so that E ranges from 0 to n and w ranges from 0 to 1. To determine an approximation of $N^{[2]}(n, E)$, the wireless device may first determine an approximation of $\log N^{[2]}(n, E)$. The approximation of $\log N^{[2]}(n, E)$ may correspond to $\log \hat{N}=^{[2]}(n, E)$. In some cases, an equation for determining $\log \hat{N}^{[2]}(n, E)$ may be defined by Equation 11:

$$\log \hat{N}^{[2]}(n, E) = nH^{[2]}(\omega) - \frac{1}{2}\log\left(2\pi n V^{[2]}(\omega)\right) + c(E) + \frac{1}{n}G_1^{[2]}(\omega). \quad (11)$$

Equation 11 may include an $H^{[2]}(\omega)$ function, a $V^{[2]}(\omega)$ function, and a $$G_1^{[2]}(\omega)$$

function, each of which include w as an argument. The $H^{[2]}(\omega)$ from Equation 10 may correspond to a function that is scaled by n and has the normalized energy ω as its argument. Additionally, the term $$-\frac{1}{2}\log\left(2\pi n V^{[2]}(\omega)\right)$$

may contain a term that scales logarithmically in n. In some cases, the term $$-\frac{1}{2}\log\left(2\pi n V^{[2]}(\omega)\right)$$

may be rewritten in various ways, one of which is illustrated below in Equation 12:

$$-\frac{1}{2}\log\left(2\pi n V^{[2]}(\omega)\right) = -\frac{1}{2}\log n - \frac{1}{2}\log V^{[2]}(\omega) - \frac{1}{2}\log(2\pi). \quad (12)$$

The function $$G_1^{[2]}(\omega)$$

from Equation 11 may be scaled by a number that can be expressed as one over a power of n, for example 1/n. Equation 11 may additionally include a function c(E) with an argument of the transmission energy E.

In some cases (e.g., in cases where 0 log 0=0), the function $H^{[2]}(\omega)$ may be defined according to Equation 13:

$$H^{[2]}(\omega) = -\omega\log\omega - (1-\omega)\log(1-\omega). \quad (13)$$

In some cases, the function $H^{[2]}(\omega)$ may correspond to a binary entropy function. Additionally, in the example of $H^{[2]}(\omega)$ as defined in Equation 13, the logarithm may correspond to either a natural logarithm (e.g., $\log_e$ (•) or ln(•)) or a binary logarithm (e.g., $\log_2$ (•)). In some instance, a wireless device using the approximation formula to determine an approximation of $N^{[2]}(n, E)$ (e.g., to determine $\hat{N}^{[2]}(n, E)$) may rely on a same logarithm (e.g., natural logarithm or a binary logarithm) for each of the calculations associated with the approximation.

The function $V^{[2]}(\omega)$ may be defined according to Equation 14:

$$V^{[2]}(\omega) = \omega(1-\omega). \quad (14)$$

In cases that the approximation formula (e.g., Equation 11) is associated with a natural logarithm, the function $$G_1^{[2]}(\omega)$$

may be defined according to Equation 15:

$$G_1^{[2]}(\omega) = \frac{1}{12} - \frac{1}{12\omega} - \frac{1}{12(1-\omega)}. \quad (15)$$

Additionally, in cases that the approximation formula (e.g., Equation 11) is associated with a binary logarithm, the function $$G_1^{[2]}(\omega)$$

may be defined according to Equation 16:

$$G_1^{[2]}(\omega) = \frac{1}{\ln 2}\left(\frac{1}{12} - \frac{1}{12\omega} - \frac{1}{12(1-\omega)}\right). \quad (16)$$

The function c(E) from the approximation formula defined in Equation 11 may be independent of the size m of the alphabet $\mathcal{A}_m$. That is, the function c(E) may improve an accuracy of the approximation formula defined in Equation 11 (e.g., in cases where E is relatively small or near 0, in cases where E is relatively large or near $nE(a_m)$). In some instances, c(E) may be a symmetric function, where c(E) and c $(nE(a_m)-E)$ are equal when E is smaller than a threshold value $E_0$. In some instances, the values of c(E) may be stored in memory at the wireless device (e.g., within a table). Additionally, or alternatively, a network entity may indicate, to the wireless device, values of c(E) associated with various values of the transmission energy E. Table 1, shown below, illustrate example values of c(E) corresponding to various values of the transmission energy E.

TABLE 1

| E | c(E) |
|---|---|
| 1 | $2.2719 \times 10^{-3}$ |
| 2 | $3.2597 \times 10^{-4}$ |
| 3 | $9.9852 \times 10^{-5}$ |
| 4 | $4.2661 \times 10^{-5}$ |
| 5 | $2.1975 \times 10^{-5}$ |
| 6 | $1.2760 \times 10^{-5}$ |
| 6 | $8.0520 \times 10^{-6}$ |

In an example where the alphabet $\mathcal{A}_m$ includes three or more symbols (e.g., m≥3), an equation for determining log $\hat{N}^{[m]}(n, E)$ may be defined by Equation 17:

$$\log\hat{N}^{[m]}(n, E) = nH^{[m]}(\omega) - \frac{1}{2}\log\left(2\pi n V^{[m]}(\omega)\right) + c(E) + \sum_{i=1}^{T_{max}} \frac{1}{n^i} G_i^{[m]}(\omega). \quad (17)$$

The function of $$G_i^{[m]}(\omega)$$

from Equation 17, where m≥3 may include a series of functions with $$G_i^{[m]}(\omega)$$

being scaled by $1/n^i$. In some cases, to identify $\log \hat{N}^{[m]}(n, E)$ when m≥3, $T_{max}$ may be set to either 1 or 2. That is, setting $T_{max}$ to either 1 or 2 may enable a wireless device to approximate $\log N^{[m]}(n, E)$ with an accuracy that is above a threshold. Thus, the equation for determining $\log \hat{N}^{[m]}(n, E)$ may be rewritten according to Equation 18:

$$\log\hat{N}^{[m]}(n, E) = nH^{[m]}(\omega) - \frac{1}{2}\log\left(2\pi n V^{[m]}(\omega)\right) + c(E) + \frac{1}{n}G_1^{[m]}(\omega) + \frac{1}{n^2}G_2^{[m]}(\omega). \tag{18}$$

In some cases, the function of $H^{[m]}(0)$ from Equations 17 and 18 where m≥3, may be defined (e.g., preconfigured, predefined) to be 0. For other nonzero values of ω, where ω∈{0, $E(a_m)$}, the function of $H^{[m]}(\omega)$ from Equations 17 and 18, where m≥3, may be defined according to Equation 19:

$$H^{[m]}(\omega) = \log Z_0(\lambda(\omega)) - \omega \log \lambda(\omega). \tag{19}$$

In some cases, Equation 19 may additionally be written as Equation 20:

$$H^{[m]}(\omega) = -\sum\nolimits_{i=1}^{m} \frac{\lambda(\omega)^{E(a_i)}}{Z_0(\lambda(\omega))} \log \frac{\lambda(\omega)^{E(a_i)}}{Z_0(\lambda(\omega))}. \tag{20}$$

In some examples, $Z_0$ may correspond to a polynomial, where given an alphabet $\mathcal{A}_m$, the univariate polynomial $Z_0(z)$ may be defined according to Equation 21:

$$Z_0(z) = \sum\nolimits_{i=1}^{m} z^{E(a_i)}. \tag{21}$$

Additionally, the polynomial $Z_0$ may correspond with an admissible polynomial in cases that $Z_0(0)>0$ and a greatest common divisor of $\{E(a_i)|i\geq 2\}$ is 1. Additionally, given an alphabet $\mathcal{A}_m$, the univariate polynomial $Z_j(z)$, where j≥1 may be defined according to Equation 22:

$$Z_j(z) = \sum\nolimits_{i=1}^{m} E(a_i)^j z^{E(a_i)}. \tag{22}$$

Additionally, for ω∈{0, $E(a_m)$}, λ(ω) may be a unique nonnegative real solution to Equation 23:

$$\frac{Z_1(\lambda)}{Z_0(\lambda)} = \omega. \tag{23}$$

In both of Equations 19 and 20, the function $H^{[m]}(\omega)$ may correspond to a binary entropy function. Additionally, in the example of $H^{[m]}(\omega)$) as defined in Equations 19 and 20, the logarithm may correspond to either a natural logarithm (e.g., $\log_e(\cdot)$ or $\ln(\cdot)$) or a binary logarithm (e.g., $\log_2(\cdot)$). In some instance, a wireless device using the approximation formula defined in Equations 17 and 18 to determine an approximation of $N^{[m]}(n, E)$ (e.g., to determine $\hat{N}^{[m]}(n, E)$) may rely on a same logarithm (e.g., natural logarithm or a binary logarithm) for each of the calculations associated with the approximation.

The function of $H^{[m]}(\omega)$ from Equations 17 and 18, where m≥3 may correspond to an entropy of a probability distribution $p_\omega$ over $\{E(a_1), E(a_2), \ldots, E(a_m)\}$, where the probability distribution $p_\omega$ may be defined according to Equation 24:

$$p_\omega(E(a_i)) = \frac{\lambda(\omega)^{E(a_i)}}{Z_0(\lambda(\omega))}. \tag{24}$$

In the example of Equation 24, the ω may correspond to a mean of the probability distribution $p_\omega$. Additionally, when $0<\lambda(\omega)\leq 1$, the distribution $p_\omega$ may correspond to a Maxwell-Boltzmann (MB) distribution with parameter ν(ω) that satisfies Equation 25:

$$e^{-\nu(\omega)} = \lambda(\omega). \tag{25}$$

In some cases, the function $V^{[m]}(0)$ from Equations 17 and 18 where m≥3 may be defined (e.g., preconfigured, predefined) to be 0. For other nonzero values of ω, where ω∈{0, $E(a_m)$}, the function of $V^{[m]}(\omega)$ from Equations 17 and 18 where m≥3, may be defined according to Equation 26:

$$V^{[m]}(\omega) = \frac{Z_2(\lambda(\omega))}{Z_0(\lambda(\omega))} - \omega^2. \tag{26}$$

In some examples, the function $V^{[m]}(\omega)$ may correspond to a variance corresponding to the probability distribution $p_\omega$. That is, the first term in the Equation 26 of the $V^{[m]}(\omega)$ may be represented according to Equation 27 while the second term of the $V^{[m]}(\omega)$ may be represented according to Equation 28:

$$\frac{Z_2(\lambda(\omega))}{Z_0(\lambda(\omega))} = \sum\nolimits_{i=1}^{m} \frac{\lambda(\omega)^{E(a_i)}}{Z_0(\lambda(\omega))} E(a_i)^2, \tag{27}$$

$$\omega^2 = \left(\sum_{i=1}^{m} \frac{\lambda(\omega)^{E(a_i)}}{Z_0(\lambda(\omega))} E(a_i)\right)^2. \tag{28}$$

In some instances, the function $$G_1^{[m]}(\omega)$$

from Equation 18 where m≥3 may be defined according to Equation 29, which may be associated with a natural logarithm (e.g., in cases that the wireless device applies Equation 18 using natural logarithms):

$$G_1(\omega) = C_1(\omega). \tag{29}$$

Additionally, in cases that the wireless device applies Equation 18 using binary logarithms, the function $$G_1^{[m]}(\omega)$$

may be defined according to Equation 30:

$$G_1(\omega) = \frac{1}{\ln 2} C_1(\omega). \tag{30}$$

In some cases, the function $$G_2^{[m]}(\omega)$$

from Equation 18 where m≥3 may be defined according to Equation 31, which may be associated with a natural logarithm (e.g., in cases that the wireless device applies Equation 18 using natural logarithms):

$$G_2(\omega) = C_2(\omega) - \frac{1}{2} C_1(\omega)^2. \tag{31}$$

Additionally, in cases that the wireless device applies Equation 18 using binary logarithms, the function $$G_2^{[m]}(\omega)$$

may be defined according to Equation 32:

$$G_2(\omega) = \frac{1}{\ln 2}\left(C_2(\omega) - \frac{1}{2} C_1(\omega)^2\right). \tag{32}$$

In some examples, the wireless device may perform the distribution matching procedure at 315 to obtain the n-length amplitude sequence 320 from k source bits 305 using the approximation of the log $\hat{N}^{[m]}(n, E)$ (e.g., according to Equations 11, 17, or 18).

At 325, the wireless device may perform amplitude-to-bit mapping to transform the n-length amplitude sequence 320 into a binary sequence, for example, using a binary function b( ). The binary function may transform an M-array amplitude (e.g., including each amplitude sequence of the n-length amplitude sequence 320) using binary mapping to generate n(M−1) amplitude binary bits 330.

At 335, the wireless device may perform a channel coding procedure on the (M−1) amplitude binary bits 330 and the γn source bits 310 to create n(1−γ) parity bits 340. For example, the channel coding procedure may involve systematic FEC encoding procedure. In some cases, the (M−1) amplitude binary bits 330 and the γn source bits 310 together correspond to n(M−1+γ) bits being input to a channel encoder (e.g., a systematic FEC encoder). Additionally, the channel coding procedure (e.g., the FEC encoding procedure) may generate the n (1−γ) parity bits 340. In some cases, a systematic FEC code rate $R_c$ may be defined according to Equation 33:

$$R_c = \frac{M - 1 + \gamma}{M}. \tag{33}$$

At 345, the wireless device may perform sign bit extraction to convert the n(1−γ) parity bits 340 and the γn source bits 310 to create an n-length sign sequence 350. The sign bits extraction may include performing sign mapping based on uniformly distributed bits (e.g., uniformly distributed γn source bits 310 and n (1−γ) parity bits 340) to create the n-length sign sequence 350.

The wireless device may combine (e.g., by pointwise multiplication) the n-length amplitude sequence 320 with the n-length sign sequence 350 to determine n constellation points 355 to modulate. That is, the wireless device may encode the n-length amplitude sequence 320 to obtain the n constellation points 355.

At 360, the wireless device may modulate the n constellation points 355. In some examples, the wireless device may modulate the n constellation points 355 according to a probabilistic constellation shaping scheme. Additionally, modulating the n constellation points 355 may generate a codeword for transmission to one or more other wireless devices. For example, the wireless device may perform a power scaling modulation by power scaling the n constellation points 355 according to the probabilistic constellation shaping scheme to obtain a codeword. The wireless device may then transmit the modulated n constellation points in a signal (e.g., within a codeword). In some cases, a transmission rate may be defined according to Equation 34:

$$R_t = R_{dm} + \gamma. \tag{34}$$

Figure 4:
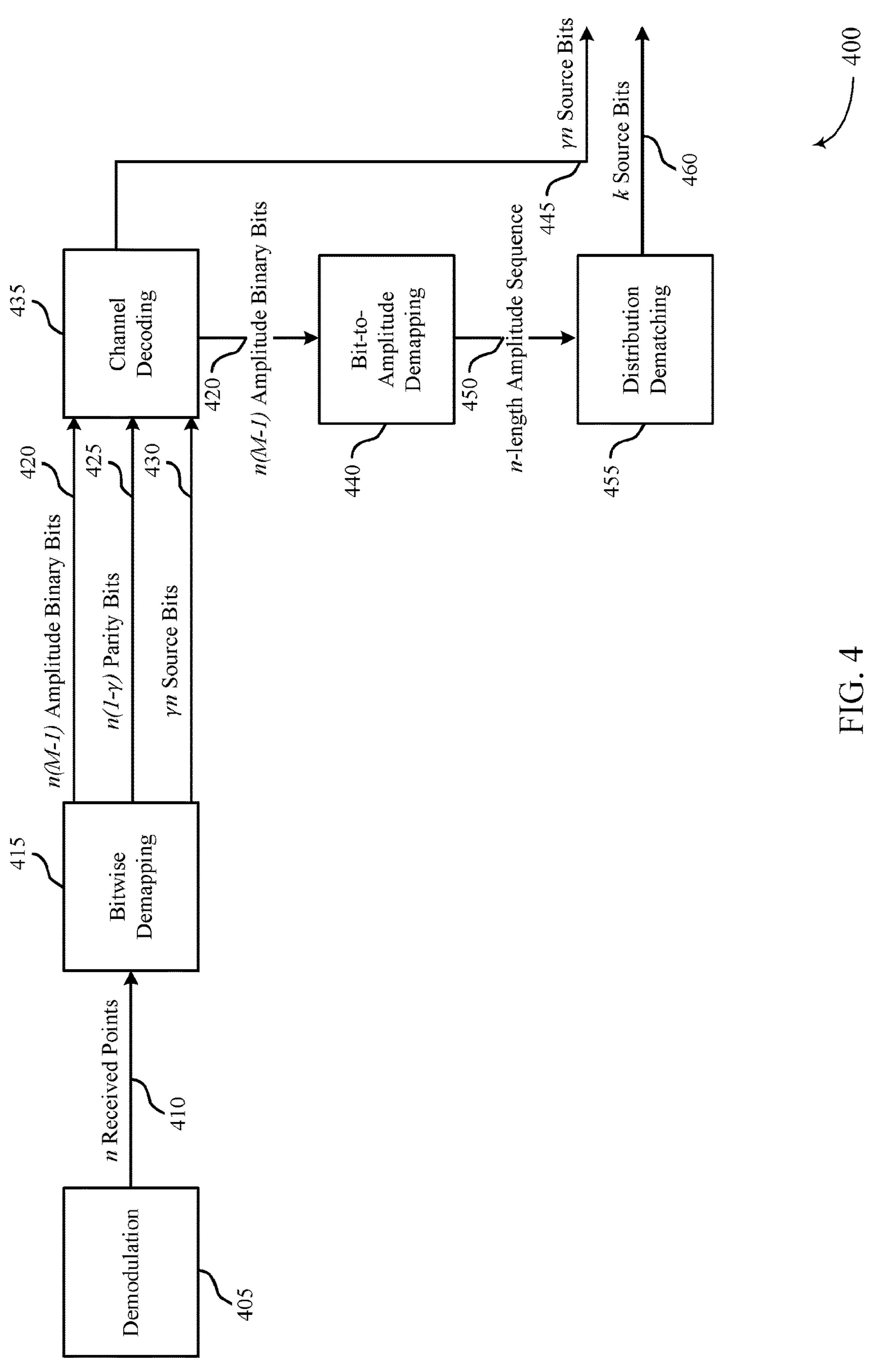

FIG. 4 illustrates an example of a PAS process 400 that supports approximations in distribution matching procedures in accordance with one or more aspects of the present disclosure. The PAS process 400 may be performed by a wireless device, such as a UE 115 or a network entity 105, in a wireless communications system described with reference to FIGS. 1 and 2. In some examples, the wireless device may perform the PAS process 400 to receive a set of non-uniformly distributed symbols for transmission. As described herein, at 460 the wireless device may perform a distribution dematching procedure using an approximation of quantities of distributed amplitude symbol sequences that each have a same length and a same transmission energy. In some cases, a wireless device may perform the PAS process 400 based on receiving a signal transmitted by another wireless device that performs the PAS process 300.

At 405, the wireless device may demodulate a received signal (e.g., via a codeword) to obtain n received points 410 (e.g., n constellation points). At 410, the wireless device may perform bitwise demapping on the n received points 410 to generate n(M−1) amplitude binary bits 420, n(1−γ) parity bits 425, and γn source bits 430. In some cases, the bitwise demapping may correspond to bitwise demapping using a log likelihood ratio (LLR).

At 435, the wireless device may perform channel decoding on the n received points 410 to generate n(M−1) amplitude binary bits 420, n(1−γ) parity bits 425, and γn source bits 430 to obtain the n(M−1) amplitude binary bits 420 and the γn source bits 430. In some cases, to perform the channel decoding, a wireless device may perform a systematic FEC decoding procedure.

At 440, the wireless device may perform a bit-to-amplitude demapping on the n(M−1) amplitude binary bits 420 to obtain an n-length amplitude sequence 450.

At 455, the wireless device may perform a distribution dematching procedure to obtain k source bits 460 based on the n-length amplitude sequence 450. In some cases, the wireless device may perform the distribution dematching procedure at 455 based on determining an approximation of the log $\hat{N}^{[m]}(n, E)$ (e.g., as described with reference to FIG. 3). That is, the wireless device may approximate the approximation of the log $N^{[m]}(n, E)$, where n corresponds to the length of the n-length amplitude sequence 450 and the E corresponds to a transmission energy associated with the signal demodulated at 405 (e.g., the transmission energy associated with the n-length amplitude sequence 450).

Based on performing the distribution dematching procedure, the wireless device may obtain the k source bits 460. Thus, the wireless device may receive a set of information bits including the k source bits 460 and the γn source bits 430.

Figure 5:
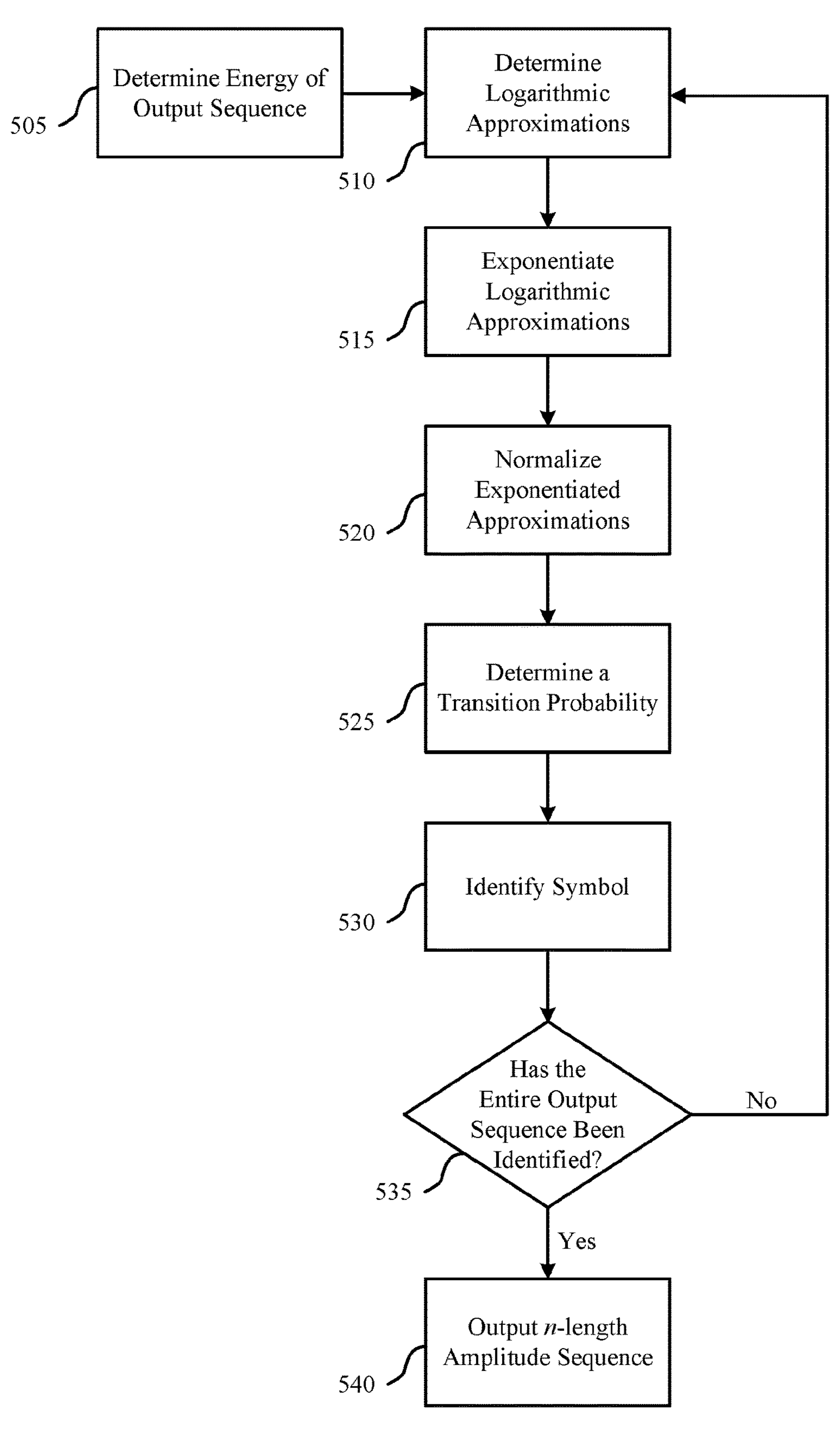
FIGS. 5 and 6 illustrate examples of flowcharts illustrating methods that support approximations in distribution matching procedures in accordance with one or more aspects of the present disclosure.

FIG. 5 shows a flowchart illustrating a method 500 that supports approximations in distribution matching procedures in accordance with one or more aspects of the present disclosure. In some cases, the method 500 may illustrate an example method for performing a distribution matching procedure (e.g., a two-step arithmetic coding distribution matching for fixed-to-fixed distribution matching procedure) using an approximation of a quantity of distributed amplitude symbol sequences that each have a same length and a same transmission energy.

For example, a wireless device may perform the method 500 in order to obtain an n-length amplitude sequence (e.g., a distributed amplitude symbol sequence) associated with k source bits (e.g., a set of information bits). In some cases, the k source bits may correspond to a k-bit sequence ($u_1, u_2, \ldots, u_k$). Additionally, the wireless device may rely on a dyadic number $x \in [0, 1)$ with the binary expansion 0 to indicate the k-bit sequence (e.g., $u_1, u_2 \ldots u_k$). In some cases, the method 500 may be associated with outputting an n-length amplitude sequence $s=(s_1, s_2, \ldots, s_n) \in \mathcal{S}(m, n, \overline{E})$ based on performing the distribution matching procedure on a k-bit sequence input. Here, the output sequence s may be from the set $\mathcal{S}(m, n, \overline{E})$, where $\mathcal{S}(m, n, \overline{E})$ is the set of all symbol sequences of length n and using the alphabet $\mathcal{A}_m$ that have a transmission energy less than $\overline{E}$. In some instances, a cardinality of the set $\mathcal{S}(m, n, \overline{E})$ may correspond to $$N_c^{[m]}(n, \overline{E}).$$

At 505, the wireless device may determine an energy of the output sequence (e.g., a transmission energy associated with the distributed amplitude symbol sequence) associated with the input sequence (e.g., the k-bit sequence). In some cases, the wireless device may determine the energy E of the output sequence $s=(s_1, s_2, \ldots, s_n)$ based on a predefined parameter (e.g., based on signaling previously exchanged between the wireless device and another wireless device indicating the energy E of the output sequence s). Additionally, the energy E may correspond to a maximum threshold associated with the transmission energy of the output sequence s.

At 510, the wireless device may determine logarithmic approximations quantities of distributed amplitude symbol sequences that have a same transmission energy E (e.g., based on the transmission energy E identified at 505) and the same length n based on the length n of the output sequence s (e.g., log $\hat{N}^{[m]}(n, E)$). In some cases, the wireless device may determine the logarithmic approximations of log $\hat{N}^{[m]}(n, E)$ according to Equation 11, 17, or 18 as described with reference to FIG. 3. For example, the wireless device may first determine a $$Q_i^t$$

for each $i \in \{1, 2, \ldots, m\}$ according to Equation 35:

$$Q_i^t = \log \hat{N}(n_t - 1, E_t - E(a_i)). \tag{35}$$

In some cases, the wireless device may initialize (e.g., when first proceeding to 510 from 505) t to 0, $n_t$ to n, and $E_t$ to E. Based on determining $$Q_i^t$$

for each $i \in \{1, 2, \ldots, m\}$, the wireless device may identify a maximum $$Q_i^t$$

(e.g., a $\overline{Q}^t$). For example, the wireless device may identify $\overline{Q}^t$ as defined according to Equation 36:

$$\overline{Q}^t = \max\{Q_i^t \mid i \in \{1, 2, \ldots, m\}\}. \tag{36}$$

At 515, the wireless device may exponentiate the logarithmic approximations determined at 510. For example, for each $i \in \{1, 2, \ldots, m\}$, the wireless device may compute either $$e^{Q_i^t - \overline{Q}^t} \text{ or } 2^{Q_i^t - \overline{Q}^t}.$$

In some cases, the wireless device may compute the exponentiation $$e^{Q_i^t - \overline{Q}^t}$$

in cases that the wireless device relies on a natural logarithm for determining the approximations. Additionally, the wireless device may compute the exponentiation $$2^{\mathcal{Q}_i^t-\overline{\mathcal{Q}}^t}$$

in cases that the wireless device relies on a binary logarithm for determining approximations. That is, the wireless device may select a base for the exponentiation based on a base used for determining the approximations.

At 520, the wireless device may perform normalizations on the exponentiations determined at 515. For example, for each $i \in \{1, 2, \ldots, m\}$, the wireless device may perform a normalization as defined in Equations 37 and 38. That is, in cases that the wireless device is computing approximations of $\log \hat{N}^{[m]}(n, E)$ using natural logarithms, the wireless device may perform normalizations as defined in Equation 37:

$$\hat{p}_{t+1}(a_i) = \frac{e^{\mathcal{Q}_i^t-\overline{\mathcal{Q}}^t}}{\sum_{j=1}^{m} e^{\mathcal{Q}_j^t-\overline{\mathcal{Q}}^t}}. \tag{37}$$

Additionally, in cases that the wireless device is computing approximations of $\log \hat{N}^{[m]}(n, E)$ using binary logarithms, the wireless device may perform normalizations as defined in Equation 38:

$$\hat{p}_{t+1}(a_i) = \frac{2^{\mathcal{Q}_i^t-\overline{\mathcal{Q}}^t}}{\sum_{j=1}^{m} 2^{\mathcal{Q}_j^t-\overline{\mathcal{Q}}^t}}. \tag{38}$$

At 525, the wireless device may determine an approximation of a transition probability $\hat{p}_{t+1}(a_i)$ associated with the symbol $s_{t+1}$ based on performing the normalization at 520. That is, wireless device may determine the approximation of the transition probability $\hat{p}_{t+1}(a_i)$ corresponding to symbol $s_{t+1}$ of the sequence s. That is, the wireless device may rely on Equations 35, 36, and 37 or 38 to approximate each transition probability ratio $\hat{p}_{t+1}(a_i)$ according to Equation 39:

$$\hat{p}_{t+1}(a_i) = \frac{\hat{N}(n_t - 1, E_t - E(a_i))}{\sum_{l=1}^{m} \hat{N}(n_t - 1, E_t - E(a_l))}. \tag{39}$$

At 530, the wireless device may identify the symbol $s_{t+1}$ of the sequence s based on determining the approximation of the transition probabilities $\hat{p}_{t+1}(a_i)$ and the k-bit sequence (e.g., $u_1 u_2 \ldots u_k$). For example, the wireless device may rely on the transition probabilities $\hat{p}_{t+1}(a_i)$ and the dyadic x from the k-bit sequence (e.g., $u_1 u_2 \ldots u_k$) to determine the symbol $s_{t+1}$ of the sequence s.

At 535, the wireless device may determine whether the entire sequence s has been identified (e.g., whether each of the symbols $s_1, s_2, \ldots, s_n$ of the sequence s have been identified). In cases that $t=n-1$, the wireless device may determine that the entire sequence s has been identified and proceed to 540. In cases that $t<n-1$, the wireless device may increment t by 1 (e.g., set $t=t+1$), update n (e.g., set $n_{t+1}=n_t-1$), update E (e.g., set $E_{t+1}=E_t-E(s_{t+1})$ and proceed to 510.

At 540, the wireless device may output the n-length amplitude sequence (e.g., a distributed amplitude symbol sequence having a length n). For example, the wireless device may output the n-length amplitude sequence and subsequently perform an amplitude-to-bit mapping procedure on the n-length amplitude sequence (e.g., as described with reference to FIG. 3).

While the method 500 illustrates a method for a transmitting wireless device to output an n-length amplitude sequence based on a k bit sequence, a receiving wireless device may perform a similar method for outputting a k-length bit sequence $(\widehat{u_1}, \widehat{u_2}, \ldots, \widehat{u_k})$ as an estimate of the transmitted bit sequence $(u_1, u_2, \ldots, u_k)$ based on a received sequence $s=(s_1, s_2, \ldots, s_n)$ (e.g., as part of a distribution dematching procedure). For example, the receiving wireless device may perform a similar initial identification of the transmission energy E associated with the sequence $s=(s_1, s_2, \ldots, s_n)$ (e.g., similar to the method performed by the transmitting wireless device at 505). Additionally, the receiving wireless device may then sequentially refine an initial estimate in n iterations, which may be used by the receiving wireless device to determine the final estimate of the k-length bit sequence $(\widehat{u_1}, \widehat{u_2}, \ldots, \widehat{u_k})$.

Figure 6:
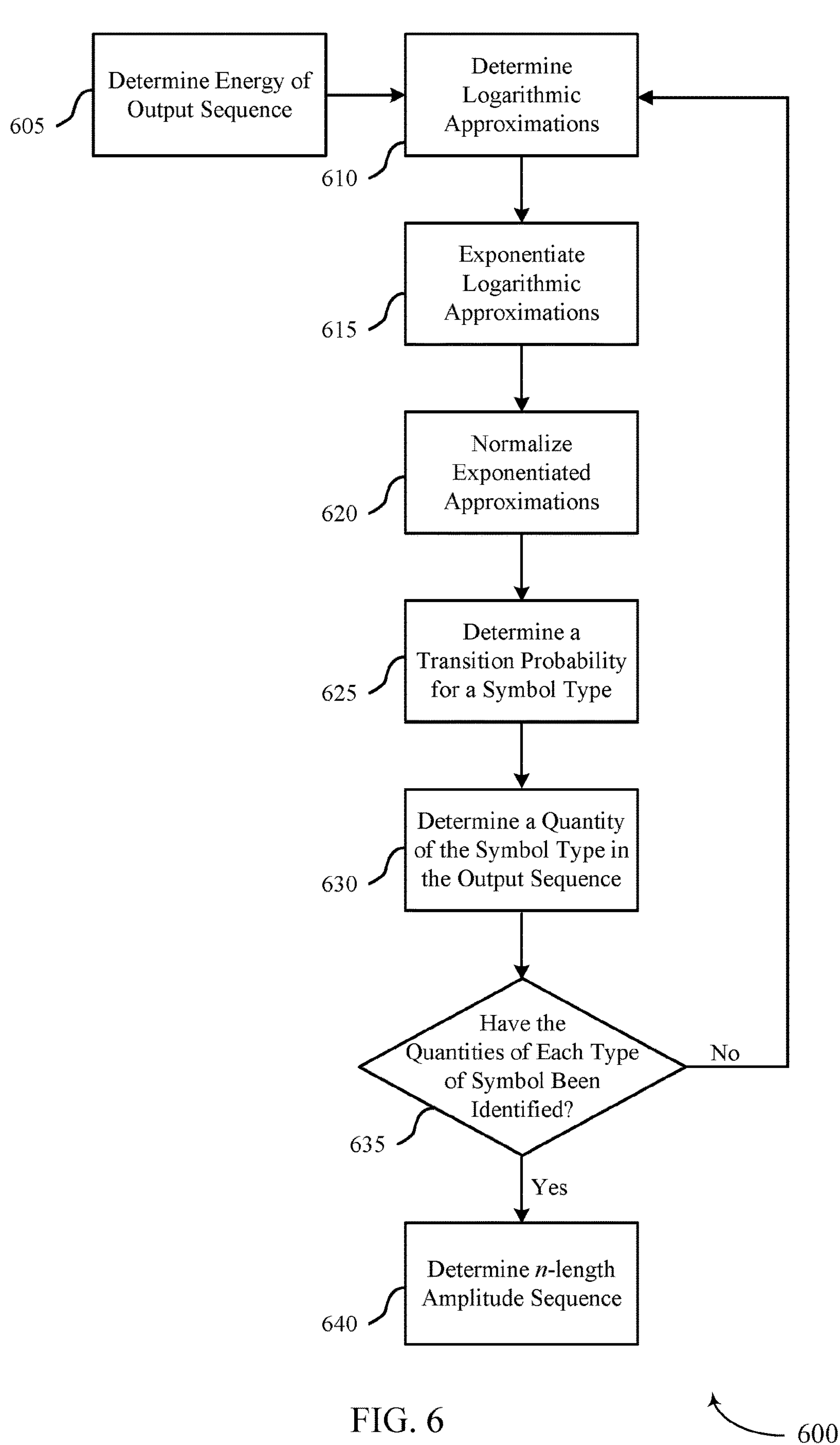

FIG. 6 shows a flowchart illustrating a method 600 that supports approximations in distribution matching procedures in accordance with one or more aspects of the present disclosure. In some cases, the method 600 may illustrate an example method for performing a distribution matching procedure (e.g., a three-phase peeling distribution matching procedure) using an approximation of a quantity of distributed amplitude symbol sequences that each have a same length and a same transmission energy.

For example, a wireless device may perform the method 600 in order to obtain an n-length amplitude sequence (e.g., a distributed amplitude symbol sequence) associated with k source bits (e.g., a set of information bits). In some cases, the k source bits may correspond to a k-bit sequence $(u_1, u_2, \ldots, u_k)$. Additionally, the wireless device may rely on a dyadic number $x \in [0, 1)$ with the binary expansion 0 to indicate the k-bit sequence (e.g., $u_1 u_2 \ldots u_k$). In some cases, the method 600 may be associated with outputting an n-length amplitude sequence $s=(s_1, s_2, \ldots, s_n) \in \mathcal{S}(m, n, \overline{E})$ based on performing the distribution matching procedure on a k-bit sequence input. Here, the output sequence s may be from the set $\mathcal{S}(m, n, \overline{E})$ that includes each distributed amplitude symbol sequence associated with an alphabet size m, a length n, and a transmission energy less than $\overline{E}$. In some instances, a cardinality of the set $\mathcal{S}(m, n, \overline{E})$ may correspond to $$N_c^{[m]}(n, \overline{E}).$$

At 605, the wireless device may determine an energy of the output sequence (e.g., a transmission energy associated with the distributed amplitude symbol sequence) associated with the input sequence (e.g., the k-bit sequence). In some cases, the wireless device may determine the energy E of the output sequence $s=(s_1, s_2, \ldots, s_n)$ based on a predefined parameter (e.g., based on signaling previously exchanged between the wireless device and another wireless device indicating the energy E of the output sequence s). Additionally, the energy E may correspond to a maximum threshold associated with the transmission energy of the output sequence s.

At 610, the wireless device may determine logarithmic approximations of the quantity of distributed amplitude symbol sequences that have the energy E (e.g., based on the transmission energy identified at 605) and the same length as the output sequence s (e.g., log $\hat{N}^{[m]}(n, E)$). In some cases, the wireless device may determine the logarithmic approximations of log $\hat{N}^{[m]}(n, E)$ according to Equation 11, 17, or 18 as described with reference to FIG. 3. For example, the wireless device may first determine a $Q_{k_{m-j}}$ for each $k_{m-j} \in [\underline{k}_{m-j}(n_j E_j), \overline{k}_{m-j}(n_j, E_j)]$ according to Equation 40:

$$Q_{k_{m-j}} = \log\hat{N}^{[m-j-1]}(n_j - k_{m-j}, E_j - k_{m-j}E(a_{m-j})). \tag{40}$$

In some cases, the wireless device may initialize (e.g., when first proceeding to from 605) j to 0, $n_j$ to n, and $E_j$ to E. The wireless device may additionally determine a $B_{k_{m-j}}$ for each $k_{m-j} \in [\underline{k}_{m-j}(n_j, E_j), \overline{k}_{m-j}(n_j, E_j)]$ according to Equation 41:

$$B_{k_{m-j}} = \log\hat{N}^{[2]}(n_j, k_{m-j}). \tag{41}$$

The wireless device may then determine, for each $k_{m-j} \in [\underline{k}_{m-j}(n_j, E_j), \overline{k}_{m-j}(n_j, E_j)]$, an associated $C_{k_{m-j}}$ as defined according to Equation 42:

$$C_{k_{m-j}} = Q_{k_{m-j}} + B_{k_{m-j}}. \tag{42}$$

Based on determining the $C_{k_{m-j}}$ for each $k_{m-j} \in [\underline{k}_{m-j}(n_j, E_j), \overline{k}_{m-j}(n_j, E_j)]$, the wireless device may identify a maximum $C_{k_{m-j}}$ (e.g., a $\overline{C}_{m-j}$). For example, the wireless device may identify $\overline{C}_{m-j}$ as defined according to Equation 43:

$$\overline{C}_{m-j} = \max\{C_{k_{m-j}} \mid k_{m-j} \in [\underline{k}_{m-j}(n_j, E_j), \overline{k}_{m-j}(n_j, E_j)]\}. \tag{43}$$

At 615, the wireless device may exponentiate the logarithmic approximations determined at 610. For example, for each $k_{m-j} \in [\underline{k}_{m-j}(n_j, E_j), \overline{k}_{m-j}(n_j, E_j)]$, the wireless device may compute either $$e^{C_{k_{m-j}} - \overline{C}_{m-j}} \text{ or } 2^{C_{k_{m-j}} - \overline{C}_{m-j}}.$$

In some cases, the wireless device may compute the exponentiations $$e^{C_{k_{m-j}} - \overline{C}_{m-j}}$$

in cases that the wireless device relies on a natural logarithm for determining the approximations. Additionally, the wireless device may compute the exponentiations $$2^{C_{k_{m-j}} - \overline{C}_{m-j}}$$

in cases that the wireless device relies on a binary logarithm for determining approximations. That is, the wireless device may select a base for the exponentiations based on a base used for determining the approximations.

At 620, the wireless device may perform normalizations on the exponentiations determined at 615. For example, for each $k_{m-j} \in [\underline{k}_{m-j}(n_j, E_j), \overline{k}_{m-j}(n_j, E_j)]$, the wireless device may perform a normalization as defined in Equations 44 and 45. That is, in cases that the wireless device is computing approximations of log $\hat{N}^{[m]}(n, E)$ using natural logarithms, the wireless device may perform normalizations as defined in Equation 44. Additionally, in cases that the wireless device is computing approximations of log $\hat{N}^{[m]}(n, E)$ using binary logarithms, the wireless device may perform normalizations as defined in Equation 45:

$$\hat{p}(k_{m-j} \mid m-j, n_j, E_j) = \frac{e^{C_{k_{m-j}} - \overline{C}_{m-j}}}{\sum_{\kappa \in [\underline{k}_{m-j}, \overline{k}_{m-j}]} e^{C_\kappa - \overline{C}_{m-j}}}. \tag{44}$$

Additionally, in cases that the wireless device is computing approximations of log $\hat{N}^{[m]}(n, E)$ using binary logarithms, the wireless device may perform normalizations as defined in Equation 45:

$$\hat{p}(k_{m-j} \mid m-j, n_j, E_j) = \frac{2^{C_{k_{m-j}} - \overline{C}_{m-j}}}{\sum_{\kappa \in [\underline{k}_{m-j}, \overline{k}_{m-j}]} 2^{C_\kappa - \overline{C}_{m-j}}}. \tag{45}$$

At 625, the wireless device may determine an approximation of a transition probability $\hat{p}(k_{m-j} \mid m-j, n_j, E_j)$ associated with each symbol type in the alphabet $\mathcal{A}_m = \{a_1, a_2, \ldots, a_m\}$ based on performing the normalization at 620. Specifically, for each symbol type, the wireless device may rely on Equations 40 through 43 and 44 or 45 approximate the transition probability ratio $p(k_{m-j} \mid m-j, n_j, E_j)$ according to Equation 46:

$$p(k_{m-j} \mid m-j, n_j, E_j) = \frac{\hat{N}^{[2]}(n_j, k_{m-j})\hat{N}^{[m-j-1]}(n_j - k_{m-j}, E_j - k_{m-j}E(a_{m-j}))}{\sum_{\kappa \in [\underline{k}_{m-j}, \overline{k}_{m-j}]} \hat{N}^{[2]}(n_j, \kappa)\hat{N}^{[m-j-1]}(n_j - \kappa, E_j - \kappa E(a_{m-j}))}. \tag{46}$$

At 630, the wireless device may determine a quantity $k_{m-j}^*$ of the symbol type (e.g., the $(m-j)^{th}$ symbol in the alphabet $\mathcal{A}_m = \{a_1, a_2, \ldots, a_m\}$).

At 635, the wireless device may determine whether the quantities of each symbol type in the alphabet $\mathcal{A}_m = \{a_1, a_2, \ldots, a_m\}$ has been identified. For example, in cases that j=m−2, the wireless device may determine that the quantities of each symbol type in the alphabet $\mathcal{A}_m = \{a_1, a_2, \ldots, a_m\}$ has been identified. Here, the wireless device may proceed to 640. Additionally, in cases that j−m−2, the wireless device may determine that the quantities of each symbol type in the alphabet $\mathcal{A}_m = \{a_1, a_2, \ldots, a_m\}$ have not been identified (e.g., quantities of less than each symbol type in the alphabet $\mathcal{A}_m = \{a_1, a_2, \ldots, a_m\}$ have been identified. Here, the wireless device may increment j by 1 (e.g., set j=j+1), update $$n(\text{e.g., set } n_{j+1} = n_j - k_{m-j}^*),\ E(\text{e.g., set } E_{j+1} = E_j - k_{m-j}^* E(a_{m-j}))$$

and proceed to 610.

At 640, the wireless device may identify an output n-length amplitude sequence associated with the composition identified at 610 through 635. For example, the wireless device may identify the composition $$(k_1^*, k_2^*, \ldots, k_{m-1}^*, k_m^*)(\text{e.g., the } k_{m-j}^*$$

along an $(m-j)^{th}$ coordinate). In some cases, when the wireless device proceeds from 635 to 640, the wireless device may identify a composition of the n-length amplitude sequence. For example, the wireless device may identify the quantities of each symbol type in the alphabet $\mathcal{A}_m=\{a_1, a_2, \ldots, a_m\}$ that are in the n-length amplitude sequence. Based on identifying the composition of the n-length amplitude sequence, the wireless device may identify the n-length amplitude sequence. In some cases, the wireless device may subsequently perform an amplitude-to-bit mapping procedure on the n-length amplitude sequence (e.g., as described with reference to FIG. 3).

While the method 600 illustrates a method for a transmitting wireless device to output an n-length amplitude sequence based on a k bit sequence, a receiving wireless device may perform a similar method for outputting a k-length bit sequence ($\widehat{u_1}, \widehat{u_2}, \ldots, \widehat{u_k}$) as an estimate of the transmitted bit sequence ($u_1, u_2, \ldots, u_k$) based on a received sequence $s=(s_1, s_2, \ldots, s_n)$ (e.g., as part of a distribution dematching procedure). For example, the receiving wireless device may perform a similar initial identification of the transmission energy E associated with the sequence $s=(s_1, s_2, \ldots, s_n)$ (e.g., similar to the method performed by the transmitting wireless device at 505). Additionally, the receiving wireless device may then sequentially identify the composition of the composition of the received sequence s, which may be used by the receiving wireless device to determine the final estimate of the k-length bit sequence ($\widehat{u_1}, \widehat{u_2}, \ldots, \widehat{u_k}$).

Figure 7:
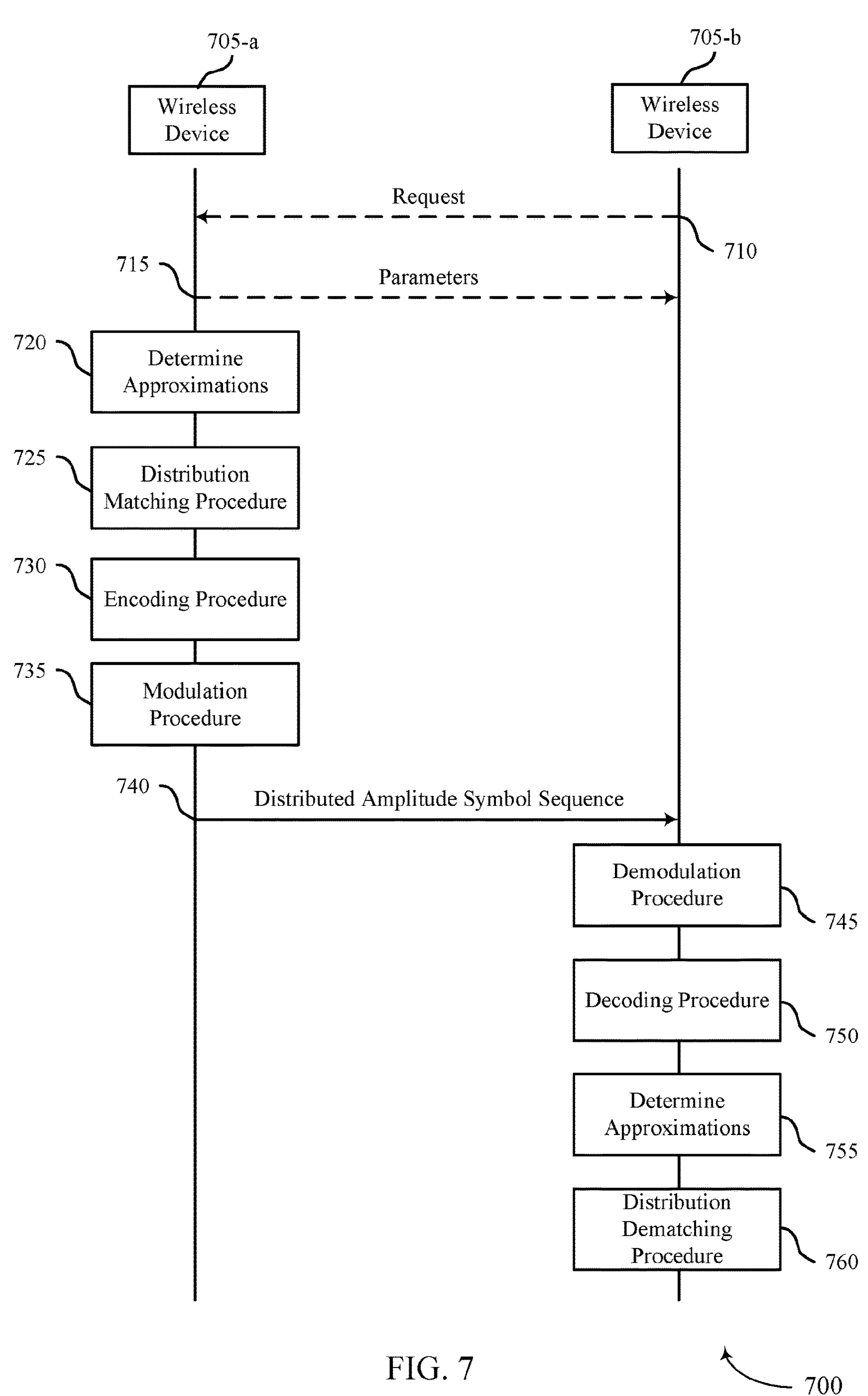
FIG. 7 illustrates an example of a process flow that supports approximations in distribution matching procedures in accordance with one or more aspects of the present disclosure.

FIG. 7 illustrates an example of a process flow 700 that supports approximations in distribution matching procedures in accordance with one or more aspects of the present disclosure. The process flow 700 may implement or be implemented by one or more aspects of the wireless communications system 100 and the wireless communications system 200. For example, the process flow 700 may include one or more wireless devices 705 (e.g., a wireless device 705-*a* and a wireless device 705-*b*), which may be examples of wireless devices as described with reference to FIGS. 1 through 6. In the following description of the process flow 700, operations between the wireless devices 705 may occur in a different order or at different times than as shown. Some operations may also be omitted from the process flow 700, and other operations may be added to the process flow 700.

At 710, the wireless device 705-*b* may optionally transmit, to the wireless device 705-*a*, signaling requesting one or more parameters associated with approximating a quantity of distributed amplitude symbol sequences.

At 715, the wireless device 705-*a* may optionally transmit, to the wireless device 705-*b*, signaling indicating one or more parameters associated with approximating the quantity of distributed amplitude symbol sequences. For example, the wireless device 705-*a* may transmit the signaling indicating the one or more parameters in response to receiving the request from the wireless device 705-*b* at 710. Additionally, the wireless device 705-*a* may transmit the signaling indicating the one or more parameters without having received the request from the wireless device 705-*b* at 710. The one or more parameters may include a modulation order associated with each of the quantity of distributed amplitude symbol sequences, an indication of a transmission energy of each of the quantity of distributed amplitude symbol sequences, or both.

At 720, the wireless device 705-*a* may determine, for a set of information bits, an approximation of a quantity of distributed amplitude symbol sequences that each have a same length and a same transmission energy (e.g., as indicated by the one or more parameters). In some instances, prior to determining the approximation, the wireless device 705-*a* may identify the same transmission energy based at least in part on the set of information bits (e.g., based on the set of information bits, based on the one or more parameters). Here, determining the approximation may be based on identifying the same transmission energy. In some examples, each of the quantity of distributed amplitude symbol sequences includes symbols from a set of symbols, and determining the approximation of the quantity of distributed amplitude symbol sequences may be based on a second quantity of symbols in the set of symbols. Additionally, the wireless device 705-*a* may determine the approximation based on determining a logarithmic approximation of the quantity of distributed amplitude symbol sequences.

In some cases, to determine the approximation, the wireless device 705-*a* may identify, based on the same length of each of the quantity of distributed amplitude symbol sequences, a portion of the same transmission energy associated with each symbol in the distributed amplitude symbol sequences and apply a set of functions to the identified portion of the same transmission energy.

At 725, the wireless device 705-*a* may perform, on the set of information bits, a distribution matching procedure using the approximation of the quantity of distributed amplitude symbol sequences to obtain a distributed amplitude symbol sequence having the same length and the same transmission energy. In some cases, the distributed amplitude symbol sequence may include a non-uniform probability distribution of amplitudes that is based on a predefined probability distribution of amplitudes. In some examples, the wireless device 705-*a* may determine one or more approximations (e.g., at 720) as part of performing the distribution matching procedure (e.g., at 725).

In some cases, the wireless device 705-*a* may identify, using the approximation of the quantity of distributed amplitude symbol sequences and based on identifying the same transmission energy, second quantities of each symbol from a set of symbols in the distributed amplitude symbol sequence (e.g., may identify a composition of the distributed amplitude symbol sequence), where the distributed amplitude symbol sequence is obtained based on identifying the second quantities of each of the set of symbols.

In some other cases, the wireless device 705-*a* may determine, for each symbol in the distributed amplitude symbol sequence using the approximation of the quantity of distributed amplitude symbol sequences and based on identifying the same transmission energy, a transition probability that is associated with a probabilistic constellation shaping scheme, where performing the distribution matching procedure is based on the transition probability for each symbol. Here, the wireless device 705-*a* may determine the transition probability by determining a set of logarithmic approximations of quantities of distributed amplitude symbol sequences, the set of logarithmic approximations including at least the approximation of the quantity of distributed amplitude symbol sequences that each have the same length and the same transmission energy, determining a set of exponentiation values each corresponding to one of the set of logarithmic approximations, and normalizing each exponentiation value in the set of exponentiation values.

At 730, the wireless device 705-*a* may encode the distributed amplitude symbol sequence in accordance with a probabilistic constellation shaping scheme.

At 735, the wireless device 705-*a* may perform, in accordance with a probabilistic constellation shaping scheme, a modulation procedure on the encoded distributed amplitude symbol sequence to obtain a codeword.

At 740, the wireless device 705-*a* may transmit, to the wireless device 705-*b*, the encoded distributed amplitude symbol sequence. In some cases, transmitting the encoded distributed amplitude symbol sequence may be based on performing the modulation procedure. Additionally, in some cases, transmitting the encoded distributed amplitude symbol sequence may include transmitting a codeword (e.g., obtained at 735) including the encoded distributed amplitude symbol sequence.

At 745, the wireless device 705-*b* may perform, in accordance with the probabilistic constellation shaping scheme, a demodulation procedure on the received codeword to obtain the encoded distributed amplitude symbol sequence.

At 750, the wireless device 705-*b* may decode the encoded distributed amplitude symbol sequence in accordance with the probabilistic constellation shaping scheme.

At 755, the wireless device 705-*b* may determine an approximation of a quantity of distributed amplitude symbol sequences that each have the same length as the distributed amplitude symbol sequence and the same transmission energy as the distributed amplitude symbol sequence. In some cases, in order to determine the approximation, the wireless device 705-*b* may first identify the same transmission energy based on the distributed amplitude symbol sequence (e.g., based on receiving the parameters at 715). In some examples, the wireless device 705-*b* may determine the approximation based on determining a logarithmic approximation of the quantity of distributed amplitude symbol sequences. Additionally, or alternatively, the wireless device 705-*b* may determine the approximation based on identifying, based on the same length of each of the quantity of distributed amplitude symbol sequences, a portion of the same transmission energy associated with each symbol in the distributed amplitude symbol sequences, and applying a set of functions to the identified portion of the same transmission energy.

At 760, the wireless device 705-*b* may perform, on the distributed amplitude symbol sequence, a distribution dematching procedure using the approximation of the quantity of distributed amplitude symbol sequences to obtain a set of information bits. In some cases, the wireless device 705-*b* may identify, using the approximation of the quantity of distributed amplitude symbol sequences and based on identifying the same transmission energy, second quantities of each symbol from a set of symbols in the distributed amplitude symbol sequence (e.g., a composition of the distributed amplitude symbol sequence). Here, the wireless device 705-*b* may obtain the set of information bits based on identifying the second quantities of each of the set of symbols.

In some other cases, the wireless device 705-*b* may determine, for each symbol in the distributed amplitude symbol sequence using the approximation of the quantity of distributed amplitude symbol sequences and based on identifying the same transmission energy, a transition probability that is associated with a probabilistic constellation shaping scheme. Here, the wireless device 705-*b* may perform the distribution dematching procedure based on determining the transition probability for each symbol. In some cases, the wireless device 705-*b* may determine the transition probability by determining a set of logarithmic approximations of quantities of distributed amplitude symbol sequences, the set of logarithmic approximations including at least the approximation of the quantity of distributed amplitude symbol sequences that each have the same length and the same transmission energy, determining a set of exponentiation values each corresponding to one of the set of logarithmic approximations, and normalizing each exponentiation value in the set of exponentiation values.

In some examples, the wireless device 705-*b* may determine one or more approximations (e.g., at 755) as part of performing the distribution dematching procedure (e.g., at 760).

Figure 8:
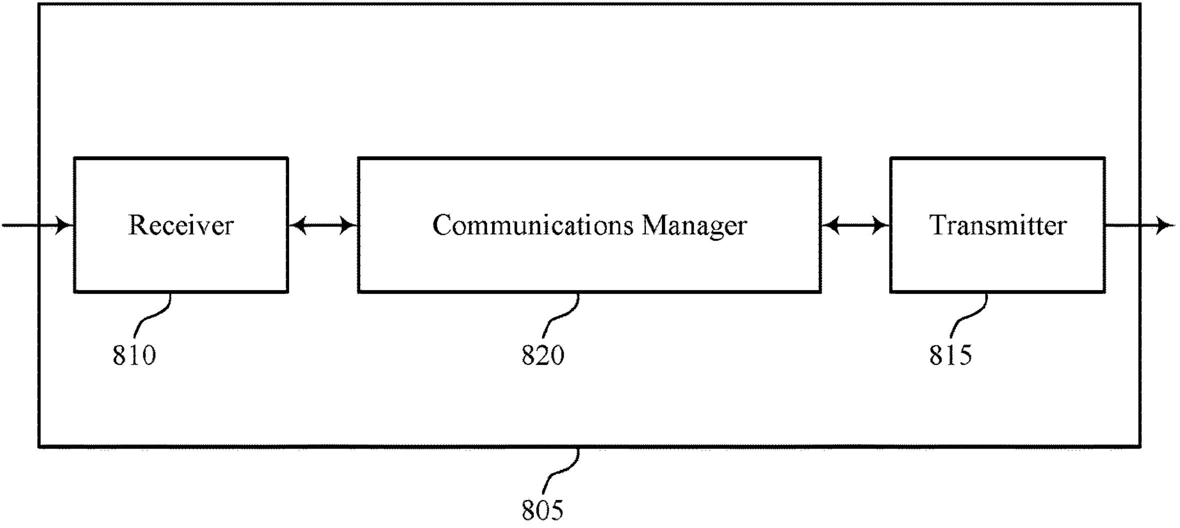
FIGS. 8 and 9 show block diagrams of devices that support approximations in distribution matching procedures in accordance with one or more aspects of the present disclosure.

FIG. 8 shows a block diagram 800 of a device 805 that supports approximations in distribution matching procedures in accordance with one or more aspects of the present disclosure. The device 805 may be an example of aspects of a wireless device as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to approximations in distribution matching procedures). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to approximations in distribution matching procedures). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of approximations in distribution matching procedures as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first wireless device in accordance with examples as disclosed herein. For example, the communications manager 820 may be configured as or otherwise support a means for determining, for a set of information bits, an approximation of a quantity of distributed amplitude symbol sequences that each have a same length and a same transmission energy. The communications manager 820 may be configured as or otherwise support a means for performing, on the set of information bits, a distribution matching procedure using the approximation of the quantity of distributed amplitude symbol sequences to obtain a distributed amplitude symbol sequence having the same length and the same transmission energy. The communications manager 820 may be configured as or otherwise support a means for encoding the distributed amplitude symbol sequence in accordance with a probabilistic constellation shaping scheme. The communications manager 820 may be configured as or otherwise support a means for transmitting, to a second wireless device, the encoded distributed amplitude symbol sequence.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing. For example, by approximating one or more quantities of distributed amplitude symbol sequences having a same length and a same transmission energy (e.g., as opposed to performing calculations necessary to calculate exact values of the quantities of distributed amplitude symbol sequences having the same length and the same transmission), the device 805 may support techniques for reduced processing.

Figure 9:
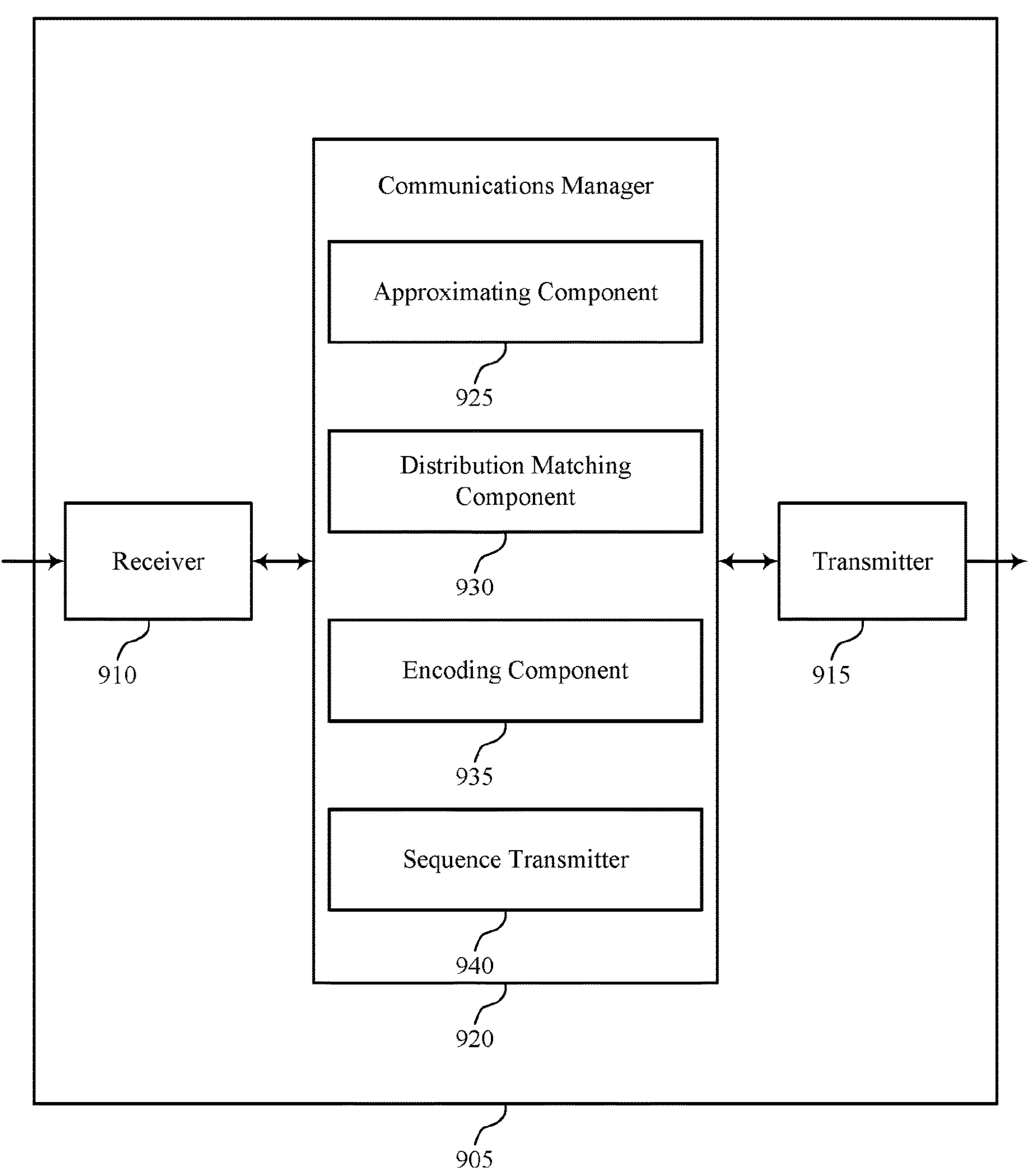

FIG. 9 shows a block diagram 900 of a device 905 that supports approximations in distribution matching procedures in accordance with one or more aspects of the present disclosure. The device 905 may be an example of aspects of a device 805, a UE 115, or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to approximations in distribution matching procedures). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to approximations in distribution matching procedures). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of approximations in distribution matching procedures as described herein. For example, the communications manager 920 may include an approximating component 925, a distribution matching component 930, an encoding component 935, a sequence transmitter 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first wireless device in accordance with examples as disclosed herein. The approximating component 925 may be configured as or otherwise support a means for determining, for a set of information bits, an approximation of a quantity of distributed amplitude symbol sequences that each have a same length and a same transmission energy. The distribution matching component 930 may be configured as or otherwise support a means for performing, on the set of information bits, a distribution matching procedure using the approximation of the quantity of distributed amplitude symbol sequences to obtain a distributed amplitude symbol sequence having the same length and the same transmission energy. The encoding component 935 may be configured as or otherwise support a means for encoding the distributed amplitude symbol sequence in accordance with a probabilistic constellation shaping scheme. The sequence transmitter 940 may be configured as or otherwise support a means for transmitting, to a second wireless device, the encoded distributed amplitude symbol sequence.

Figure 10:
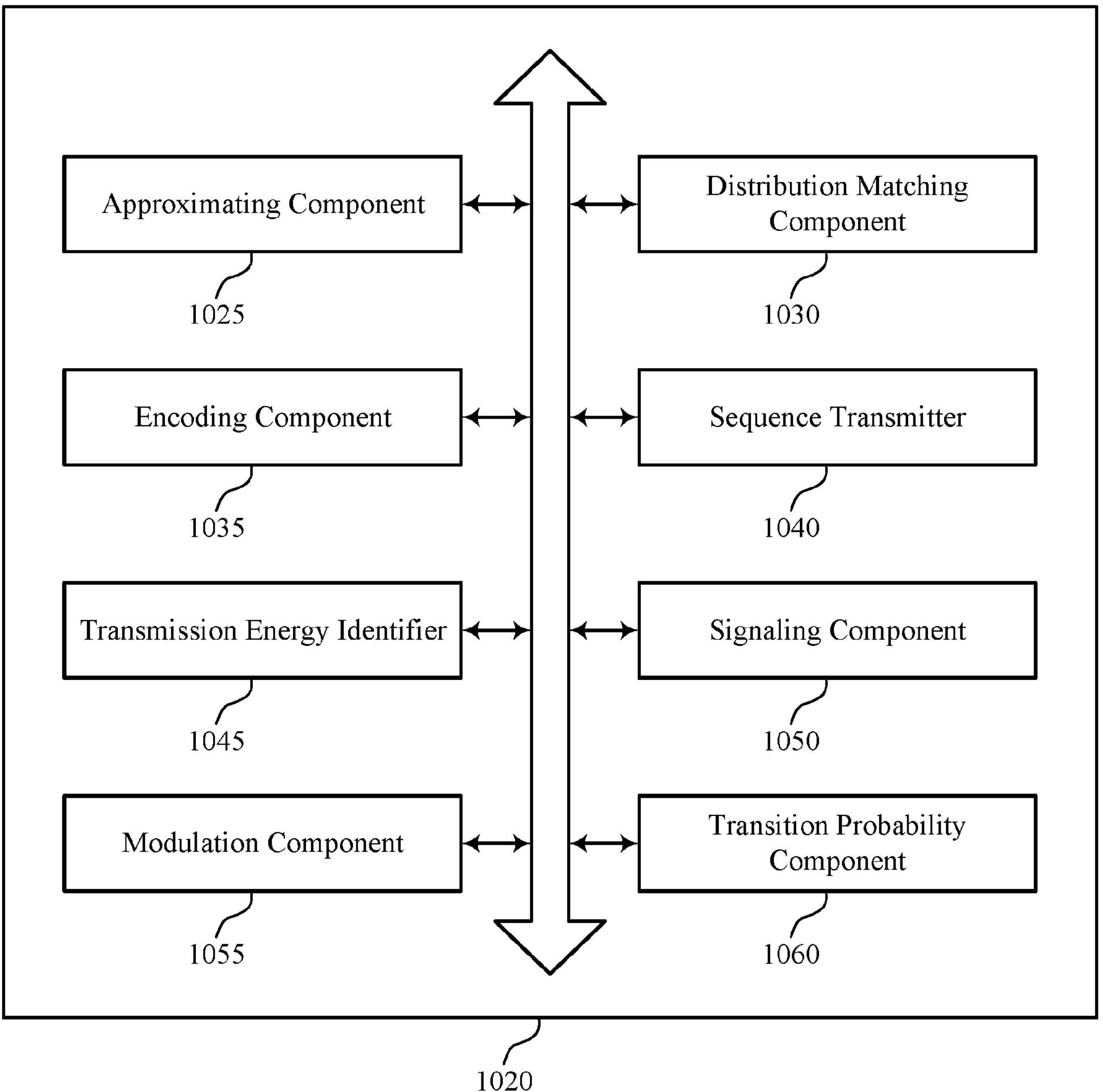
FIG. 10 shows a block diagram of a communications manager that supports approximations in distribution matching procedures in accordance with one or more aspects of the present disclosure.

FIG. 10 shows a block diagram 1000 of a communications manager 1020 that supports approximations in distribution matching procedures in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of approximations in distribution matching procedures as described herein. For example, the communications manager 1020 may include an approximating component 1025, a distribution matching component 1030, an encoding component 1035, a sequence transmitter 1040, a transmission energy identifier 1045, a signaling component 1050, a modulation component 1055, a transition probability component 1060, or any combination thereof. Each of these components may communicate, directly or indirectly, with one another (e.g., via one or more buses).

The communications manager 1020 may support wireless communication at a first wireless device in accordance with examples as disclosed herein. The approximating component 1025 may be configured as or otherwise support a means for determining, for a set of information bits, an approximation of a quantity of distributed amplitude symbol sequences that each have a same length and a same transmission energy. The distribution matching component 1030 may be configured as or otherwise support a means for performing, on the set of information bits, a distribution matching procedure using the approximation of the quantity of distributed amplitude symbol sequences to obtain a distributed amplitude symbol sequence having the same length and the same transmission energy. The encoding component 1035 may be configured as or otherwise support a means for encoding the distributed amplitude symbol sequence in accordance with a probabilistic constellation shaping scheme. The sequence transmitter 1040 may be configured as or otherwise support a means for transmitting, to a second wireless device, the encoded distributed amplitude symbol sequence.

In some examples, the transmission energy identifier 1045 may be configured as or otherwise support a means for identifying the same transmission energy based on the set of information bits, where determining the approximation is based on identifying the same transmission energy.

In some examples, to support performing the distribution matching procedure, the distribution matching component 1030 may be configured as or otherwise support a means for identifying, using the approximation of the quantity of distributed amplitude symbol sequences and based on identifying the same transmission energy, second quantities of each symbol from a set of symbols in the distributed amplitude symbol sequence, where the distributed amplitude symbol sequence is obtained based on identifying the second quantities of each of the set of symbols.

In some examples, the transition probability component 1060 may be configured as or otherwise support a means for determining, for each symbol in the distributed amplitude symbol sequence using the approximation of the quantity of distributed amplitude symbol sequences and based on identifying the same transmission energy, a transition probability that is associated with a probabilistic constellation shaping scheme, where performing the distribution matching procedure is based on the transition probability for each symbol.

In some examples, to support determining the transition probability, the transition probability component 1060 may be configured as or otherwise support a means for determining a set of logarithmic approximations of quantities of distributed amplitude symbol sequences, the set of logarithmic approximations including at least the approximation of the quantity of distributed amplitude symbol sequences that each have the same length and the same transmission energy. In some examples, to support determining the transition probability, the transition probability component 1060 may be configured as or otherwise support a means for determining a set of exponentiation values each corresponding to one of the set of logarithmic approximations. In some examples, to support determining the transition probability, the transition probability component 1060 may be configured as or otherwise support a means for normalizing each exponentiation value in the set of exponentiation values.

In some examples, each of the quantity of distributed amplitude symbol sequences includes symbols from a set of symbols. In some examples, determining the approximation of the quantity of distributed amplitude symbol sequences is based on a second quantity of symbols in the set of symbols.

In some examples, to support determining the approximation of the quantity of distributed amplitude symbol sequences, the approximating component 1025 may be configured as or otherwise support a means for determining a logarithmic approximation of the quantity of distributed amplitude symbol sequences.

In some examples, the approximating component 1025 may be configured as or otherwise support a means for identifying, based on the same length of each of the quantity of distributed amplitude symbol sequences, a portion of the same transmission energy associated with each symbol in the distributed amplitude symbol sequences. In some examples, the approximating component 1025 may be configured as or otherwise support a means for applying a set of multiple functions to the identified portion of the same transmission energy, where determining the approximation is based on applying the set of multiple functions.

In some examples, to support applying the set of multiple functions, the approximating component 1025 may be configured as or otherwise support a means for applying, to the portion of the same transmission energy, a first function that is scaled by the same length of each of the quantity of distributed amplitude symbol sequences. In some examples, to support applying the set of multiple functions, the approximating component 1025 may be configured as or otherwise support a means for applying, to the portion of the same transmission energy, a second function that is based on a logarithmic value of the same length of each of the quantity of distributed amplitude symbol sequences. In some examples, to support applying the set of multiple functions, the approximating component 1025 may be configured as or otherwise support a means for applying, to the portion of the same transmission energy, a third function that is scaled by an inverse of the same length of each of the quantity of distributed amplitude symbol sequences.

In some examples, the approximating component 1025 may be configured as or otherwise support a means for applying a second function to the same transmission energy, where determining the approximation is based on applying the second function to the same transmission energy.

In some examples, to support applying the set of multiple functions, the approximating component 1025 may be configured as or otherwise support a means for applying, over a first duration, a first function to the portion of the same transmission energy. In some examples, to support applying the set of multiple functions, the approximating component 1025 may be configured as or otherwise support a means for applying a second function to the portion of the same transmission energy over a second duration that at least partially overlaps with the first duration.

In some examples, the signaling component 1050 may be configured as or otherwise support a means for transmitting, to the second wireless device, signaling indicating one or more parameters associated with approximating the quantity of distributed amplitude symbol sequences, where transmitting the encoded distributed amplitude symbol sequence is based on transmitting the signaling.

In some examples, the one or more parameters include a modulation order associated with each of the quantity of distributed amplitude symbol sequences, the same transmission energy of each of the quantity of distributed amplitude symbol sequences, or both.

In some examples, the signaling component 1050 may be configured as or otherwise support a means for receiving, from the second wireless device, signaling requesting one or more parameters associated with approximating the quantity of distributed amplitude symbol sequences, where transmitting the encoded distributed amplitude symbol sequence is based on receiving the signaling.

In some examples, the distributed amplitude symbol sequence includes a non-uniform probability distribution of amplitudes that is based on a predefined probability distribution of amplitudes.

In some examples, the modulation component 1055 may be configured as or otherwise support a means for performing, in accordance with a probabilistic constellation shaping scheme, a modulation procedure on the encoded distributed amplitude symbol sequence to obtain a codeword, where transmitting the encoded distributed amplitude symbol sequence is based on performing the modulation procedure.

Figure 11:
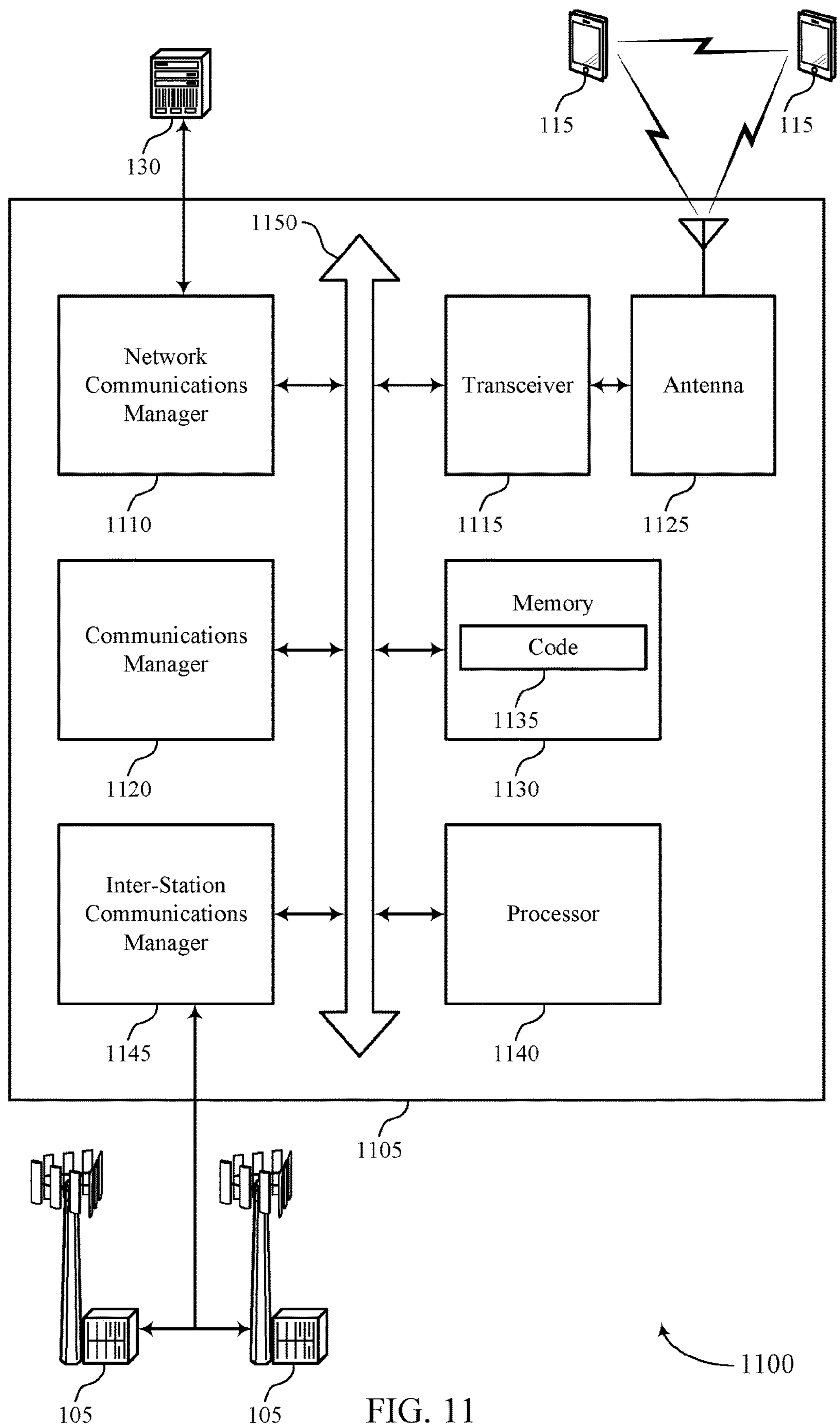
FIG. 11 shows a diagram of a system including a device that supports approximations in distribution matching procedures in accordance with one or more aspects of the present disclosure.

FIG. 11 shows a diagram of a system 1100 including a device 1105 that supports approximations in distribution matching procedures in accordance with one or more aspects of the present disclosure. The device 1105 may be an example of or include the components of a device 805, a device 905, or a wireless device as described herein. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting approximations in distribution matching procedures). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other network entities 105, and may include a controller or scheduler for controlling communications with UEs 115 in cooperation with other network entities 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between network entities 105.

The communications manager 1120 may support wireless communication at a first wireless device in accordance with examples as disclosed herein. For example, the communications manager 1120 may be configured as or otherwise support a means for determining, for a set of information bits, an approximation of a quantity of distributed amplitude symbol sequences that each have a same length and a same transmission energy. The communications manager 1120 may be configured as or otherwise support a means for performing, on the set of information bits, a distribution matching procedure using the approximation of the quantity of distributed amplitude symbol sequences to obtain a distributed amplitude symbol sequence having the same length and the same transmission energy. The communications manager 1120 may be configured as or otherwise support a means for encoding the distributed amplitude symbol sequence in accordance with a probabilistic constellation shaping scheme. The communications manager 1120 may be configured as or otherwise support a means for transmitting, to a second wireless device, the encoded distributed amplitude symbol sequence.

By including or configuring the communications manager 1120 in accordance with examples as described herein, the device 1105 may support techniques for improved user experience related to reduced processing, and improved utilization of processing capability. Specifically, by approximating one or more quantities of distributed amplitude symbol sequences having a same length and a same transmission energy (e.g., as opposed to performing calculations necessary to calculate exact values of the quantities of distributed amplitude symbol sequences having the same length and the same transmission), the device 1105 may support techniques for reduced processing.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of approximations in distribution matching procedures as described herein, or the processor 1140 and the memory 1130 may be otherwise configured to perform or support such operations.

Figure 12:
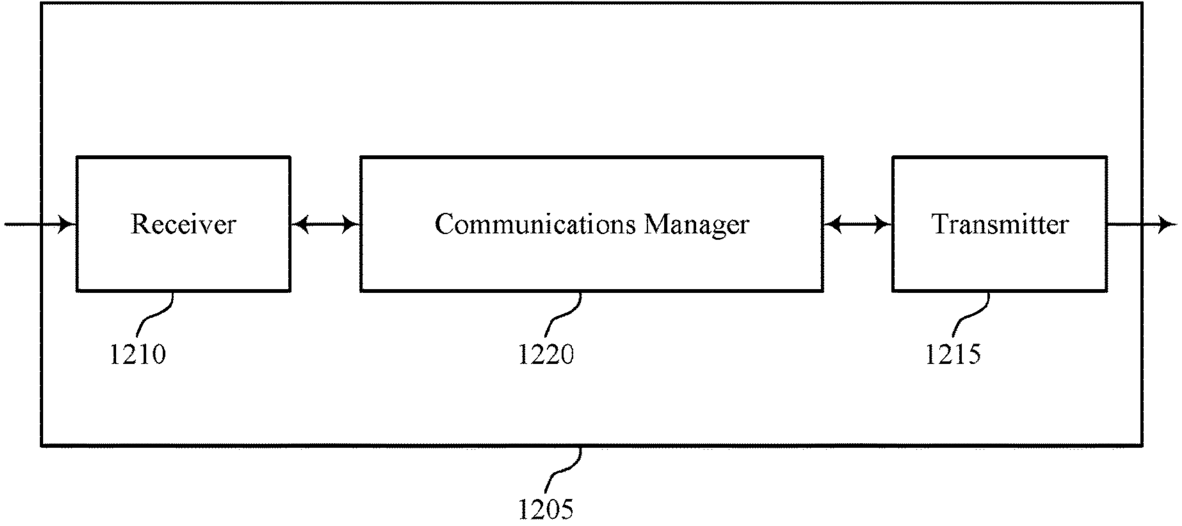
FIGS. 12 and 13 show block diagrams of devices that support approximations in distribution matching procedures in accordance with one or more aspects of the present disclosure.

FIG. 12 shows a block diagram 1200 of a device 1205 that supports approximations in distribution matching procedures in accordance with one or more aspects of the present disclosure. The device 1205 may be an example of aspects of a wireless device as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to approximations in distribution matching procedures). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to approximations in distribution matching procedures). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of approximations in distribution matching procedures as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a first wireless device in accordance with examples as disclosed herein. For example, the communications manager 1220 may be configured as or otherwise support a means for receiving, from a second wireless device, an encoded distributed amplitude symbol sequence. The communications manager 1220 may be configured as or otherwise support a means for decoding the encoded distributed amplitude symbol sequence in accordance with a probabilistic constellation shaping scheme. The communications manager 1220 may be configured as or otherwise support a means for determining an approximation of a quantity of distributed amplitude symbol sequences that each have a same length as the distributed amplitude symbol sequence and a same transmission energy as the distributed amplitude symbol sequence. The communications manager 1220 may be configured as or otherwise support a means for performing, on the distributed amplitude symbol sequence, a distribution dematching procedure using the approximation of the quantity of distributed amplitude symbol sequences to obtain a set of information bits.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for reduced processing. For example, by approximating one or more quantities of distributed amplitude symbol sequences having a same length and a same transmission energy (e.g., as opposed to performing calculations necessary to calculate exact values of the quantities of distributed amplitude symbol sequences having the same length and the same transmission), the device 1205 may support techniques for reduced processing.

Figure 13:
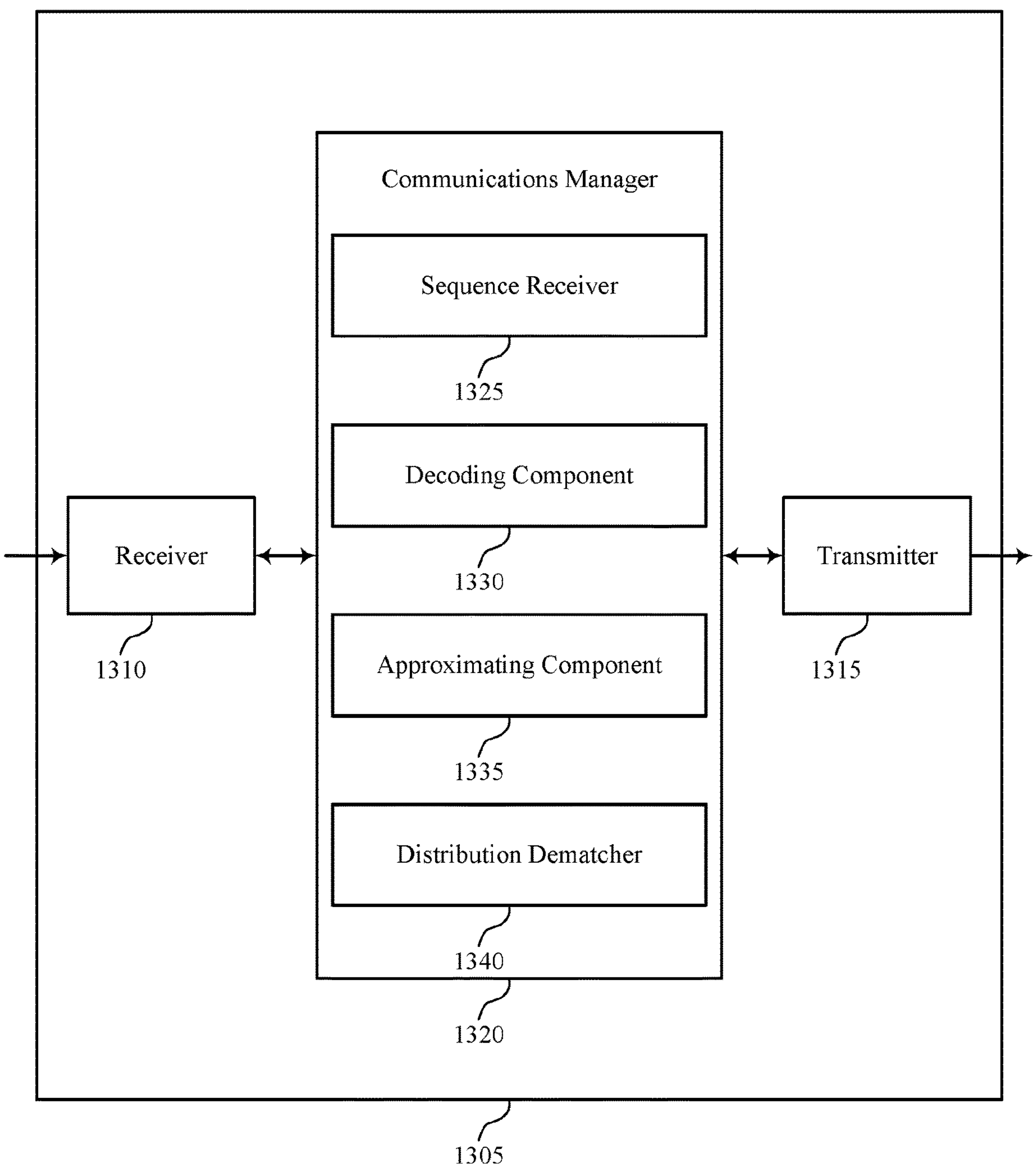

FIG. 13 shows a block diagram 1300 of a device 1305 that supports approximations in distribution matching procedures in accordance with one or more aspects of the present disclosure. The device 1305 may be an example of aspects of a device 1205, a UE 115, or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to approximations in distribution matching procedures). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to approximations in distribution matching procedures). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of approximations in distribution matching procedures as described herein. For example, the communications manager 1320 may include a sequence receiver 1325, a decoding component 1330, an approximating component 1335, a distribution dematcher 1340, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a first wireless device in accordance with examples as disclosed herein. The sequence receiver 1325 may be configured as or otherwise support a means for receiving, from a second wireless device, an encoded distributed amplitude symbol sequence. The decoding component 1330 may be configured as or otherwise support a means for decoding the encoded distributed amplitude symbol sequence in accordance with a probabilistic constellation shaping scheme. The approximating component 1335 may be configured as or otherwise support a means for determining an approximation of a quantity of distributed amplitude symbol sequences that each have a same length as the distributed amplitude symbol sequence and a same transmission energy as the distributed amplitude symbol sequence. The distribution dematcher 1340 may be configured as or otherwise support a means for performing, on the distributed amplitude symbol sequence, a distribution dematching procedure using the approximation of the quantity of distributed amplitude symbol sequences to obtain a set of information bits.

Figure 14:
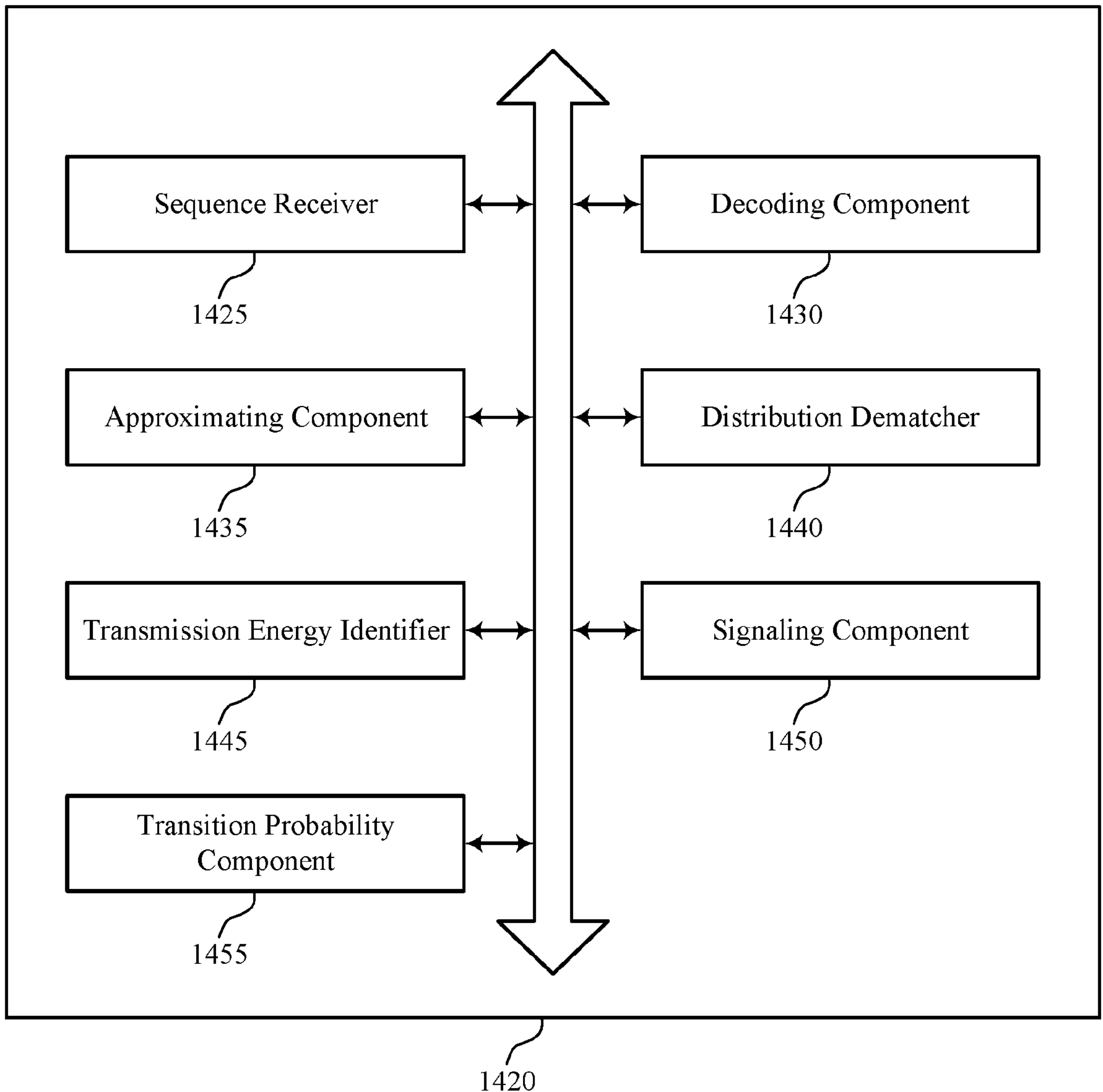
FIG. 14 shows a block diagram of a communications manager that supports approximations in distribution matching procedures in accordance with one or more aspects of the present disclosure.

FIG. 14 shows a block diagram 1400 of a communications manager 1420 that supports approximations in distribution matching procedures in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of approximations in distribution matching procedures as described herein. For example, the communications manager 1420 may include a sequence receiver 1425, a decoding component 1430, an approximating component 1435, a distribution dematcher 1440, a transmission energy identifier 1445, a signaling component 1450, a transition probability component 1455, or any combination thereof. Each of these components may communicate, directly or indirectly, with one another (e.g., via one or more buses).

The communications manager 1420 may support wireless communication at a first wireless device in accordance with examples as disclosed herein. The sequence receiver 1425 may be configured as or otherwise support a means for receiving, from a second wireless device, an encoded distributed amplitude symbol sequence. The decoding component 1430 may be configured as or otherwise support a means for decoding the encoded distributed amplitude symbol sequence in accordance with a probabilistic constellation shaping scheme. The approximating component 1435 may be configured as or otherwise support a means for determining an approximation of a quantity of distributed amplitude symbol sequences that each have a same length as the distributed amplitude symbol sequence and a same transmission energy as the distributed amplitude symbol sequence. The distribution dematcher 1440 may be configured as or otherwise support a means for performing, on the distributed amplitude symbol sequence, a distribution dematching procedure using the approximation of the quantity of distributed amplitude symbol sequences to obtain a set of information bits.

In some examples, the transmission energy identifier 1445 may be configured as or otherwise support a means for identifying the same transmission energy based on the distributed amplitude symbol sequence, where determining the approximation is based on identifying the same transmission energy.

In some examples, to support performing the distribution dematching procedure, the distribution dematcher 1440 may be configured as or otherwise support a means for identifying, using the approximation of the quantity of distributed amplitude symbol sequences and based on identifying the same transmission energy, second quantities of each symbol from a set of symbols in the distributed amplitude symbol sequence, where the set of information bits is obtained based on identifying the second quantities of each of the set of symbols.

In some examples, the transition probability component 1455 may be configured as or otherwise support a means for determining, for each symbol in the distributed amplitude symbol sequence using the approximation of the quantity of distributed amplitude symbol sequences and based on identifying the same transmission energy, a transition probability that is associated with a probabilistic constellation shaping scheme, where performing the distribution dematching procedure is based on the transition probability for each symbol.

In some examples, to support determining the transition probability, the transition probability component 1455 may be configured as or otherwise support a means for determining a set of logarithmic approximations of quantities of distributed amplitude symbol sequences, the set of logarithmic approximations including at least the approximation of the quantity of distributed amplitude symbol sequences that each have the same length as the distributed amplitude symbol sequence and the same transmission energy as the distributed amplitude symbol sequence. In some examples, to support determining the transition probability, the transition probability component 1455 may be configured as or otherwise support a means for determining a set of exponentiation values each corresponding to one of the set of logarithmic approximations. In some examples, to support determining the transition probability, the transition probability component 1455 may be configured as or otherwise support a means for normalizing each exponentiation value in the set of exponentiation values.

In some examples, each of the quantity of distributed amplitude symbol sequences includes symbols from a set of symbols. In some examples, determining the approximation of the quantity of distributed amplitude symbol sequences is based on a second quantity of symbols in the set of symbols.

In some examples, to support determining the approximation of the quantity of distributed amplitude symbol sequences, the approximating component 1435 may be configured as or otherwise support a means for determining a logarithmic approximation of the quantity of distributed amplitude symbol sequences.

In some examples, the approximating component 1435 may be configured as or otherwise support a means for identifying, based on the same length of each of the quantity of distributed amplitude symbol sequences, a portion of the same transmission energy associated with each symbol in the distributed amplitude symbol sequences. In some examples, the approximating component 1435 may be configured as or otherwise support a means for applying a set of multiple functions to the identified portion of the same transmission energy, where determining the approximation is based on applying the set of multiple functions.

In some examples, to support applying the set of multiple functions, the approximating component 1435 may be configured as or otherwise support a means for applying, to the portion of the same transmission energy, a first function that is scaled by the same length of each of the quantity of distributed amplitude symbol sequences. In some examples, to support applying the set of multiple functions, the approximating component 1435 may be configured as or otherwise support a means for applying, to the portion of the same transmission energy, a second function that is based on a logarithmic value of the same length of each of the quantity of distributed amplitude symbol sequences. In some examples, to support applying the set of multiple functions, the approximating component 1435 may be configured as or otherwise support a means for applying, to the portion of the same transmission energy, a third function that is scaled by an inverse of the same length of each of the quantity of distributed amplitude symbol sequences.

In some examples, the approximating component 1435 may be configured as or otherwise support a means for applying a second function to the same transmission energy, where determining the approximation is based on applying the second function to the same transmission energy.

In some examples, to support applying the set of multiple functions, the approximating component 1435 may be configured as or otherwise support a means for applying, over a first duration, a first function to the portion of the same transmission energy. In some examples, to support applying the set of multiple functions, the approximating component 1435 may be configured as or otherwise support a means for applying a second function to the portion of the same transmission energy over a second duration that at least partially overlaps with the first duration.

In some examples, the signaling component 1450 may be configured as or otherwise support a means for receiving, from the second wireless device, signaling indicating one or more parameters associated with approximating the quantity of distributed amplitude symbol sequences, where receiving the encoded distributed amplitude symbol sequence is based on receiving the signaling.

In some examples, the one or more parameters include a modulation order associated with each of the quantity of distributed amplitude symbol sequences, the same transmission energy of each of the quantity of distributed amplitude symbol sequences, or both.

In some examples, the signaling component 1450 may be configured as or otherwise support a means for transmitting, to the second wireless device, signaling requesting one or more parameters associated with approximating the quantity of distributed amplitude symbol sequences, where receiving the encoded distributed amplitude symbol sequence is based on transmitting the signaling.

In some examples, the distributed amplitude symbol sequence includes a non-uniform probability distribution of amplitudes that is based on a predefined probability distribution of amplitudes.

Figure 15:
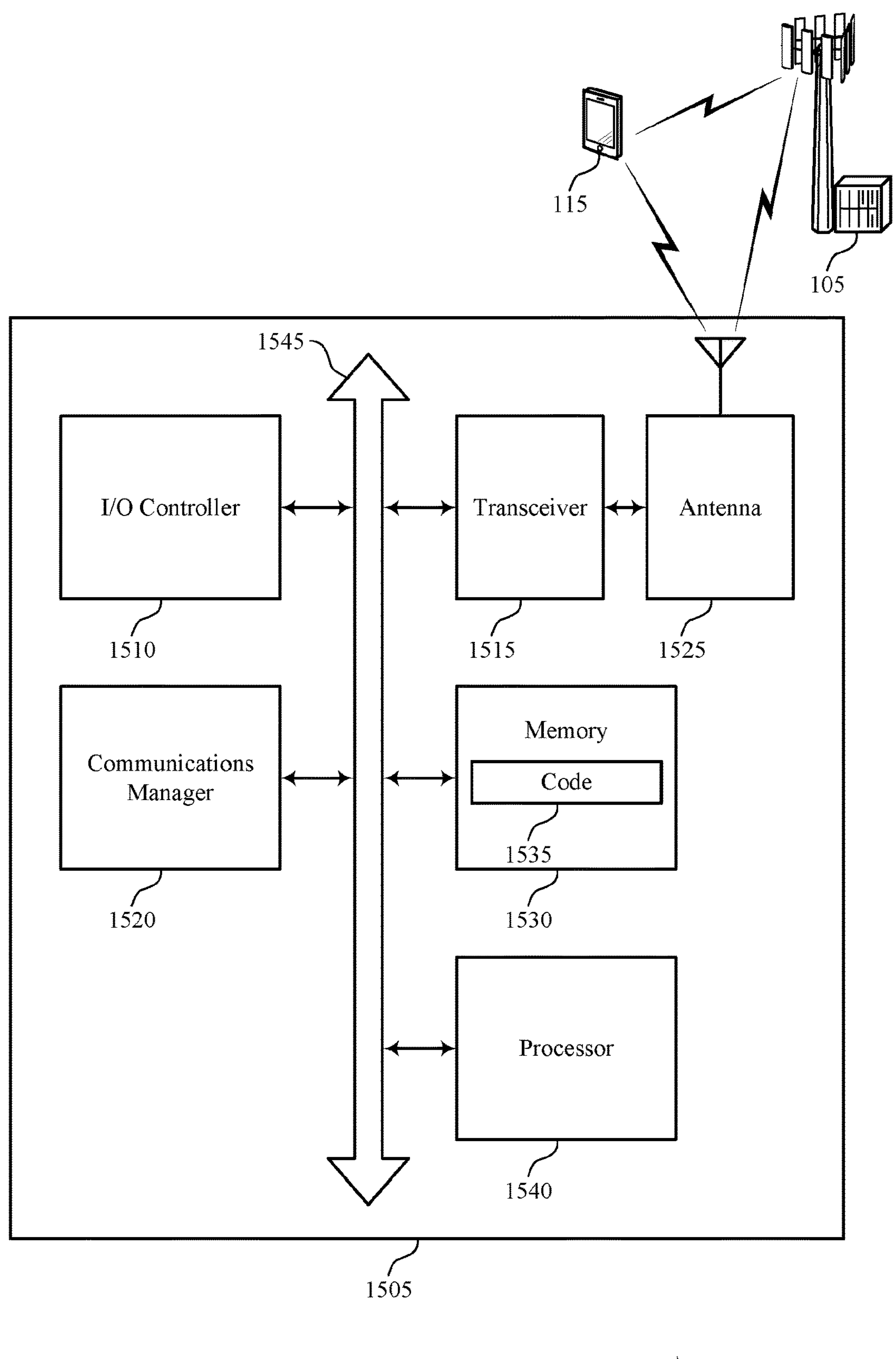
FIG. 15 shows a diagram of a system including a device that supports approximations in distribution matching procedures in accordance with one or more aspects of the present disclosure.

FIG. 15 shows a diagram of a system 1500 including a device 1505 that supports approximations in distribution matching procedures in accordance with one or more aspects of the present disclosure. The device 1505 may be an example of or include the components of a device 1205, a device 1305, or a wireless device as described herein. The device 1505 may include components for bi-directional voice and data communications including components for transmitting and receiving communications, such as a communications manager 1520, an I/O controller 1510, a transceiver 1515, an antenna 1525, a memory 1530, code 1535, and a processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally, or alternatively, the I/O controller 1510 may represent or interact with a modem, a keyboard, a mouse, a touchscreen, or a similar device. In some cases, the I/O controller 1510 may be implemented as part of a processor, such as the processor 1540. In some cases, a user may interact with the device 1505 via the I/O controller 1510 or via hardware components controlled by the I/O controller 1510.

In some cases, the device 1505 may include a single antenna 1525. However, in some other cases, the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting approximations in distribution matching procedures). For example, the device 1505 or a component of the device 1505 may include a processor 1540 and memory 1530 coupled with or to the processor 1540, the processor 1540 and memory 1530 configured to perform various functions described herein.

The communications manager 1520 may support wireless communication at a first wireless device in accordance with examples as disclosed herein. For example, the communications manager 1520 may be configured as or otherwise support a means for receiving, from a second wireless device, an encoded distributed amplitude symbol sequence. The communications manager 1520 may be configured as or otherwise support a means for decoding the encoded distributed amplitude symbol sequence in accordance with a probabilistic constellation shaping scheme. The communications manager 1520 may be configured as or otherwise support a means for determining an approximation of a quantity of distributed amplitude symbol sequences that each have a same length as the distributed amplitude symbol sequence and a same transmission energy as the distributed amplitude symbol sequence. The communications manager 1520 may be configured as or otherwise support a means for performing, on the distributed amplitude symbol sequence, a distribution dematching procedure using the approximation of the quantity of distributed amplitude symbol sequences to obtain a set of information bits.

By including or configuring the communications manager 1520 in accordance with examples as described herein, the device 1505 may support techniques for improved user experience related to reduced processing, and improved utilization of processing capability. Specifically, by approximating one or more quantities of distributed amplitude symbol sequences having a same length and a same transmission energy (e.g., as opposed to performing calculations necessary to calculate exact values of the quantities of distributed amplitude symbol sequences having the same length and the same transmission), the device 1505 may support techniques for reduced processing.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of approximations in distribution matching procedures as described herein, or the processor 1540 and the memory 1530 may be otherwise configured to perform or support such operations.

Figure 16:
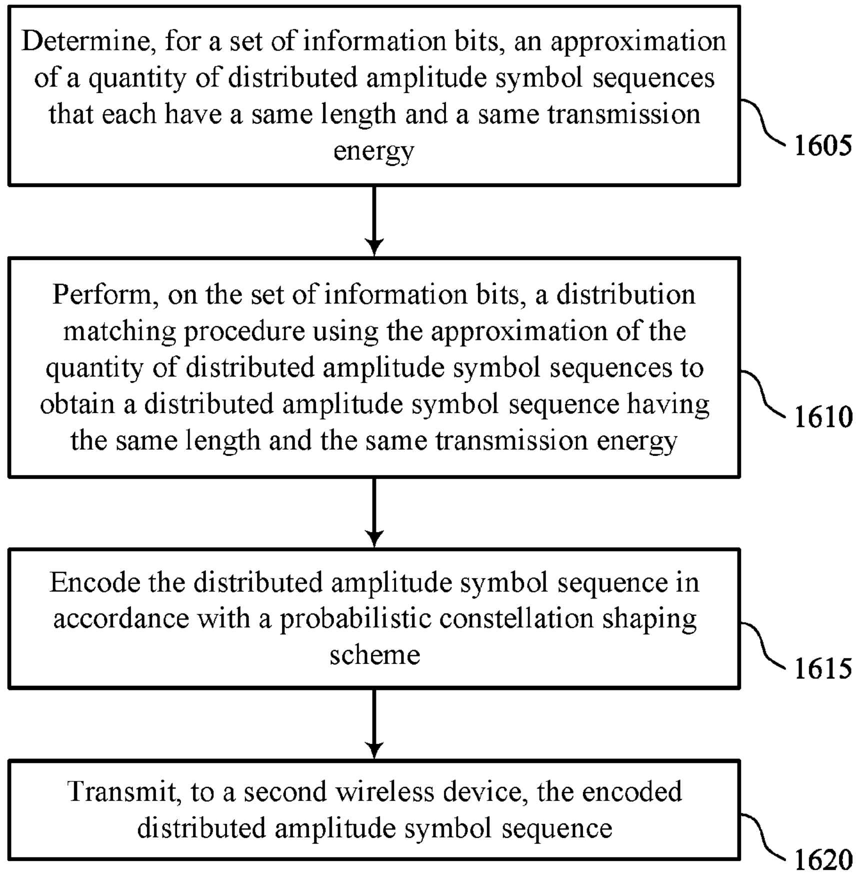
FIGS. 16 through 21 show flowcharts illustrating methods that support approximations in distribution matching procedures in accordance with one or more aspects of the present disclosure.

FIG. 16 shows a flowchart illustrating a method 1600 that supports approximations in distribution matching procedures in accordance with one or more aspects of the present disclosure. The operations of the method 1600 may be implemented by a wireless device or its components as described herein. For example, the operations of the method 1600 may be performed by a wireless device as described with reference to FIGS. 1 through 11. In some examples, a wireless device may execute a set of instructions to control the functional elements of the transmitting device to perform the described functions. Additionally, or alternatively, the wireless device may perform aspects of the described functions using special-purpose hardware.

At 1605, the method may include determining, for a set of information bits, an approximation of a quantity of distributed amplitude symbol sequences that each have a same length and a same transmission energy. The operations of 1605 may be performed in accordance with examples as disclosed herein. In some examples, aspects of the operations of 1605 may be performed by an approximating component 1025 as described with reference to FIG. 10.

At 1610, the method may include performing, on the set of information bits, a distribution matching procedure using the approximation of the quantity of distributed amplitude symbol sequences to obtain a distributed amplitude symbol sequence having the same length and the same transmission energy. The operations of 1610 may be performed in accordance with examples as disclosed herein. In some examples, aspects of the operations of 1610 may be performed by a distribution matching component 1030 as described with reference to FIG. 10.

At 1615, the method may include encoding the distributed amplitude symbol sequence in accordance with a probabilistic constellation shaping scheme. The operations of 1615 may be performed in accordance with examples as disclosed herein. In some examples, aspects of the operations of 1615 may be performed by an encoding component 1035 as described with reference to FIG. 10.

At 1620, the method may include transmitting, to a second wireless device, the encoded distributed amplitude symbol sequence. The operations of 1620 may be performed in accordance with examples as disclosed herein. In some examples, aspects of the operations of 1620 may be performed by a sequence transmitter 1040 as described with reference to FIG. 10.

Figure 17:
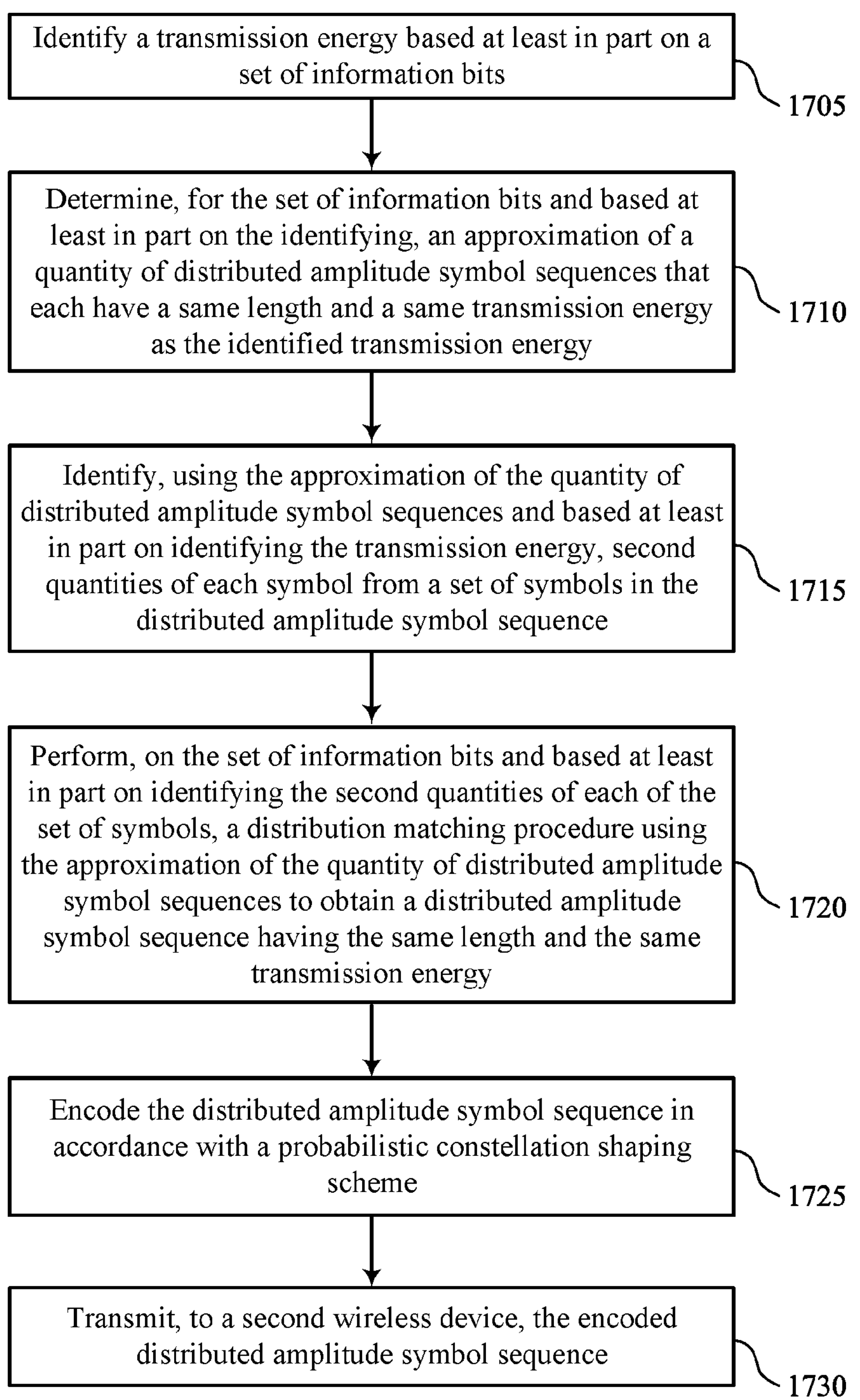

FIG. 17 shows a flowchart illustrating a method 1700 that supports approximations in distribution matching procedures in accordance with one or more aspects of the present disclosure. The operations of the method 1700 may be implemented by a wireless device or its components as described herein. For example, the operations of the method 1700 may be performed by a wireless device as described with reference to FIGS. 1 through 11. In some examples, a wireless device may execute a set of instructions to control the functional elements of the wireless device to perform the described functions. Additionally, or alternatively, the wireless device may perform aspects of the described functions using special-purpose hardware.

At 1705, the method may include identifying a transmission energy based on a set of information bits. The operations of 1705 may be performed in accordance with examples as disclosed herein. In some examples, aspects of the operations of 1705 may be performed by a transmission energy identifier 1045 as described with reference to FIG. 10.

At 1710, the method may include determining, for a set of information bits and based on the identifying, an approximation of a quantity of distributed amplitude symbol sequences that each have a same length and a same transmission energy as the identified transmission energy. The operations of 1710 may be performed in accordance with examples as disclosed herein. In some examples, aspects of the operations of 1710 may be performed by an approximating component 1025 as described with reference to FIG. 10.

At 1715, the method may include identifying, using the approximation of the quantity of distributed amplitude symbol sequences and based on identifying the transmission energy, second quantities of each symbol from a set of symbols in the distributed amplitude symbol sequence. The operations of 1715 may be performed in accordance with examples as disclosed herein. In some examples, aspects of the operations of 1715 may be performed by a distribution matching component 1030 as described with reference to FIG. 10.

At 1720, the method may include performing, on the set of information bits and based on identifying the second quantities of each of the set of symbols, a distribution matching procedure using the approximation of the quantity of distributed amplitude symbol sequences to obtain a distributed amplitude symbol sequence having the same length and the same transmission energy. The operations of 1720 may be performed in accordance with examples as disclosed herein. In some examples, aspects of the operations of 1720 may be performed by a distribution matching component 1030 as described with reference to FIG. 10.

At 1725, the method may include encoding the distributed amplitude symbol sequence in accordance with a probabilistic constellation shaping scheme. The operations of 1725 may be performed in accordance with examples as disclosed herein. In some examples, aspects of the operations of 1725 may be performed by an encoding component 1035 as described with reference to FIG. 10.

At 1730, the method may include transmitting, to a second wireless device, the encoded distributed amplitude symbol sequence. The operations of 1730 may be performed in accordance with examples as disclosed herein. In some examples, aspects of the operations of 1730 may be performed by a sequence transmitter 1040 as described with reference to FIG. 10.

Figure 18:
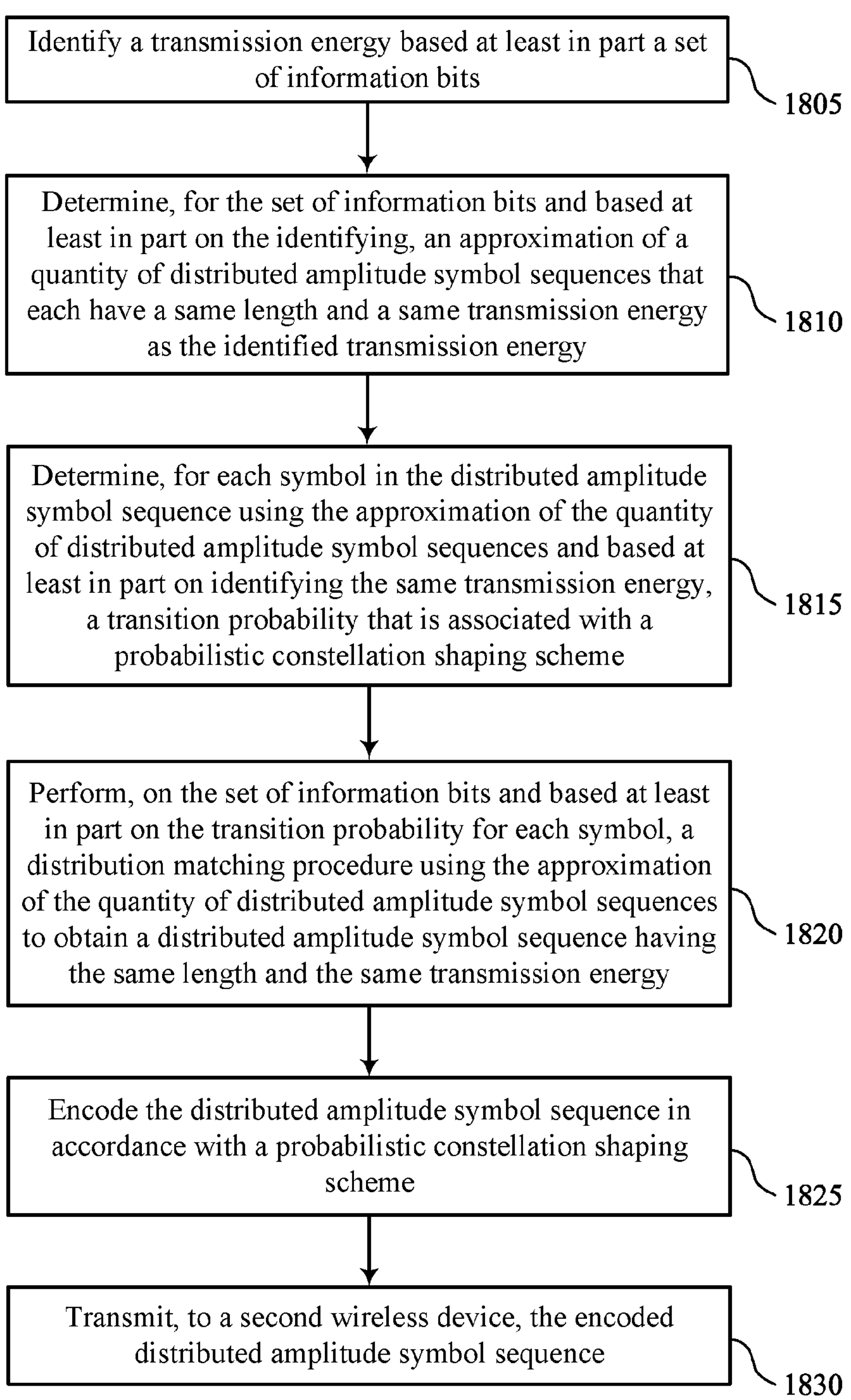

FIG. 18 shows a flowchart illustrating a method 1800 that supports approximations in distribution matching procedures in accordance with one or more aspects of the present disclosure. The operations of the method 1800 may be implemented by a wireless device or its components as described herein. For example, the operations of the method 1800 may be performed by a wireless device as described with reference to FIGS. 1 through 11. In some examples, a wireless device may execute a set of instructions to control the functional elements of the wireless device to perform the described functions. Additionally, or alternatively, the wireless device may perform aspects of the described functions using special-purpose hardware.

At 1805, the method may include identifying a transmission energy based on the set of information bits. The operations of 1805 may be performed in accordance with examples as disclosed herein. In some examples, aspects of the operations of 1805 may be performed by a transmission energy identifier 1045 as described with reference to FIG. 10.

At 1810, the method may include determining, for a set of information bits and based on the identifying, an approximation of a quantity of distributed amplitude symbol sequences that each have a same length and a same transmission energy as the identified transmission energy. The operations of 1810 may be performed in accordance with examples as disclosed herein. In some examples, aspects of the operations of 1810 may be performed by an approximating component 1025 as described with reference to FIG. 10.

At 1815, the method may include determining, for each symbol in the distributed amplitude symbol sequence using the approximation of the quantity of distributed amplitude symbol sequences and based on identifying the same transmission energy, a transition probability that is associated with a probabilistic constellation shaping scheme. The operations of 1815 may be performed in accordance with examples as disclosed herein. In some examples, aspects of the operations of 1815 may be performed by a transition probability component 1060 as described with reference to FIG. 10.

At 1820, the method may include performing, on the set of information bits and based on the transition probability for each symbol, a distribution matching procedure using the approximation of the quantity of distributed amplitude symbol sequences to obtain a distributed amplitude symbol sequence having the same length and the same transmission energy. The operations of 1820 may be performed in accordance with examples as disclosed herein. In some examples, aspects of the operations of 1820 may be performed by a distribution matching component 1030 as described with reference to FIG. 10.

At 1825, the method may include encoding the distributed amplitude symbol sequence in accordance with a probabilistic constellation shaping scheme. The operations of 1825 may be performed in accordance with examples as disclosed herein. In some examples, aspects of the operations of 1825 may be performed by an encoding component 1035 as described with reference to FIG. 10.

At 1830, the method may include transmitting, to a second wireless device, the encoded distributed amplitude symbol sequence. The operations of 1830 may be performed in accordance with examples as disclosed herein. In some examples, aspects of the operations of 1830 may be performed by a sequence transmitter 1040 as described with reference to FIG. 10.

Figure 19:
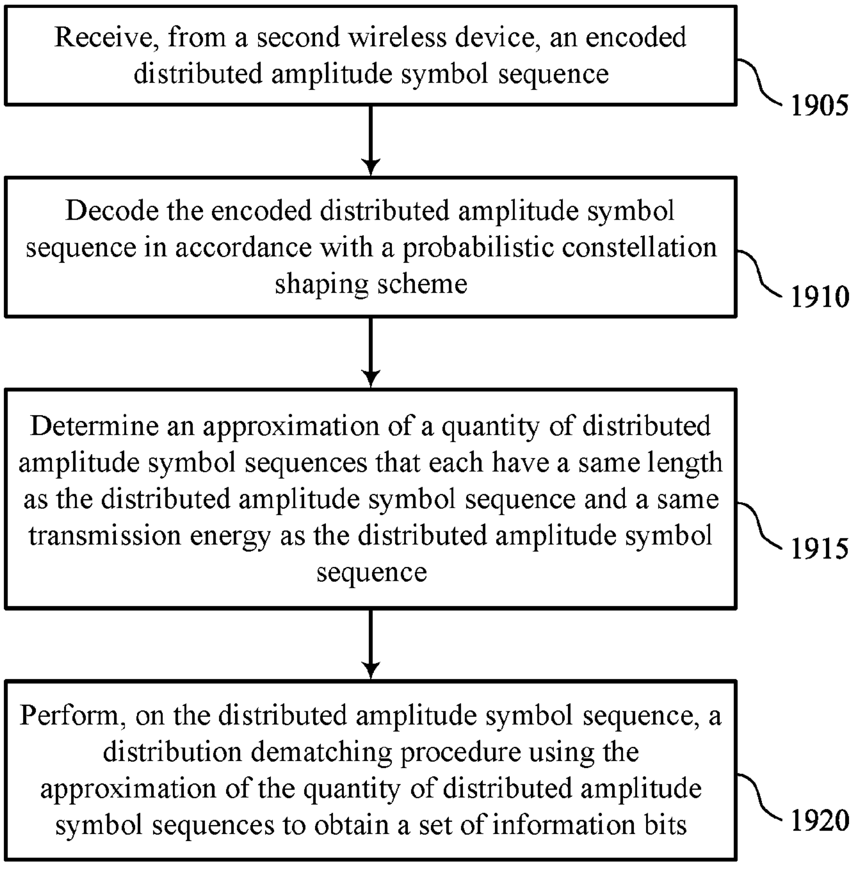

FIG. 19 shows a flowchart illustrating a method 1900 that supports approximations in distribution matching procedures in accordance with one or more aspects of the present disclosure. The operations of the method 1900 may be implemented by a wireless device or its components as described herein. For example, the operations of the method 1900 may be performed by a wireless device as described with reference to FIGS. 1 through 7 and 12 through 15. In some examples, a wireless device may execute a set of instructions to control the functional elements of the wireless device to perform the described functions. Additionally, or alternatively, the wireless device may perform aspects of the described functions using special-purpose hardware.

At 1905, the method may include receiving, from a second wireless device, an encoded distributed amplitude symbol sequence. The operations of 1905 may be performed in accordance with examples as disclosed herein. In some examples, aspects of the operations of 1905 may be performed by a sequence receiver 1425 as described with reference to FIG. 14.

At 1910, the method may include decoding the encoded distributed amplitude symbol sequence in accordance with a probabilistic constellation shaping scheme. The operations of 1910 may be performed in accordance with examples as disclosed herein. In some examples, aspects of the operations of 1910 may be performed by a decoding component 1430 as described with reference to FIG. 14.

At 1915, the method may include determining an approximation of a quantity of distributed amplitude symbol sequences that each have a same length as the distributed amplitude symbol sequence and a same transmission energy as the distributed amplitude symbol sequence. The operations of 1915 may be performed in accordance with examples as disclosed herein. In some examples, aspects of the operations of 1915 may be performed by an approximating component 1435 as described with reference to FIG. 14.

At 1920, the method may include performing, on the distributed amplitude symbol sequence, a distribution dematching procedure using the approximation of the quantity of distributed amplitude symbol sequences to obtain a set of information bits. The operations of 1920 may be performed in accordance with examples as disclosed herein. In some examples, aspects of the operations of 1920 may be performed by a distribution dematcher 1440 as described with reference to FIG. 14.

Figure 20:
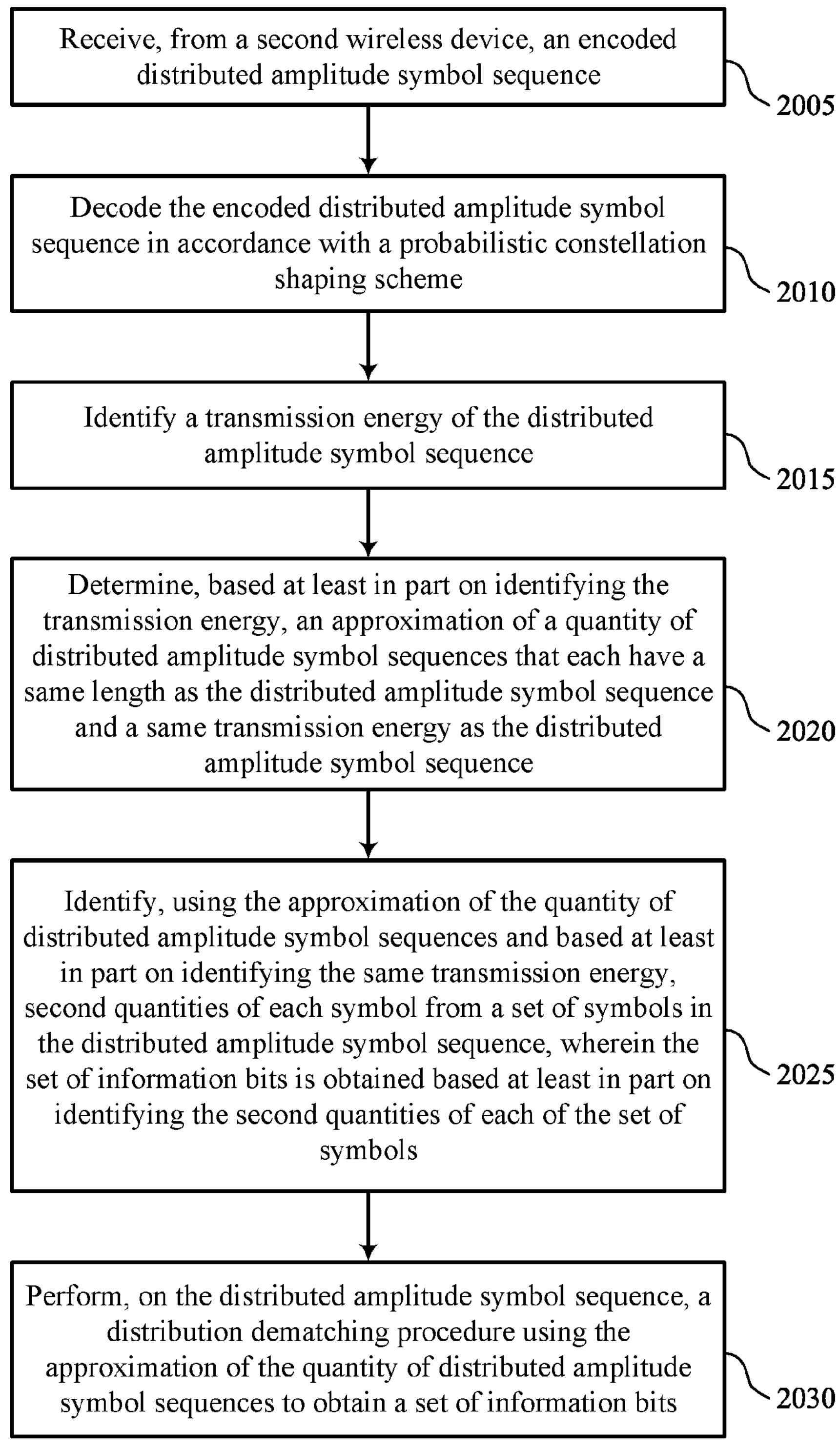

FIG. 20 shows a flowchart illustrating a method 2000 that supports approximations in distribution matching procedures in accordance with one or more aspects of the present disclosure. The operations of the method 2000 may be implemented by a wireless device or its components as described herein. For example, the operations of the method 2000 may be performed by a wireless device as described with reference to FIGS. 1 through 7 and 12 through 15. In some examples, a wireless device may execute a set of instructions to control the functional elements of the wireless device to perform the described functions. Additionally, or alternatively, the wireless device may perform aspects of the described functions using special-purpose hardware.

At 2005, the method may include receiving, from a second wireless device, an encoded distributed amplitude symbol sequence. The operations of 2005 may be performed in accordance with examples as disclosed herein. In some examples, aspects of the operations of 2005 may be performed by a sequence receiver 1425 as described with reference to FIG. 14.

At 2010, the method may include decoding the encoded distributed amplitude symbol sequence in accordance with a probabilistic constellation shaping scheme. The operations of 2010 may be performed in accordance with examples as disclosed herein. In some examples, aspects of the operations of 2010 may be performed by a decoding component 1430 as described with reference to FIG. 14.

At 2015, the method may include identifying a transmission energy of the distributed amplitude symbol sequence. The operations of 2015 may be performed in accordance with examples as disclosed herein. In some examples, aspects of the operations of 2015 may be performed by a transmission energy identifier 1445 as described with reference to FIG. 14.

At 2020, the method may include determining, based on identifying the transmission energy, an approximation of a quantity of distributed amplitude symbol sequences that each have a same length as the distributed amplitude symbol sequence and a same transmission energy as the distributed amplitude symbol sequence. The operations of 2020 may be performed in accordance with examples as disclosed herein. In some examples, aspects of the operations of 2020 may be performed by an approximating component 1435 as described with reference to FIG. 14.

At 2025, the method may include identifying, using the approximation of the quantity of distributed amplitude symbol sequences and based on identifying the same transmission energy, second quantities of each symbol from a set of symbols in the distributed amplitude symbol sequence, where the set of information bits is obtained based on identifying the second quantities of each of the set of symbols. The operations of 2025 may be performed in accordance with examples as disclosed herein. In some examples, aspects of the operations of 2025 may be performed by a distribution dematcher 1440 as described with reference to FIG. 14.

At 2030, the method may include performing, on the distributed amplitude symbol sequence, a distribution dematching procedure using the approximation of the quantity of distributed amplitude symbol sequences to obtain a set of information bits. The operations of 2030 may be performed in accordance with examples as disclosed herein. In some examples, aspects of the operations of 2030 may be performed by a distribution dematcher 1440 as described with reference to FIG. 14.

Figure 21:
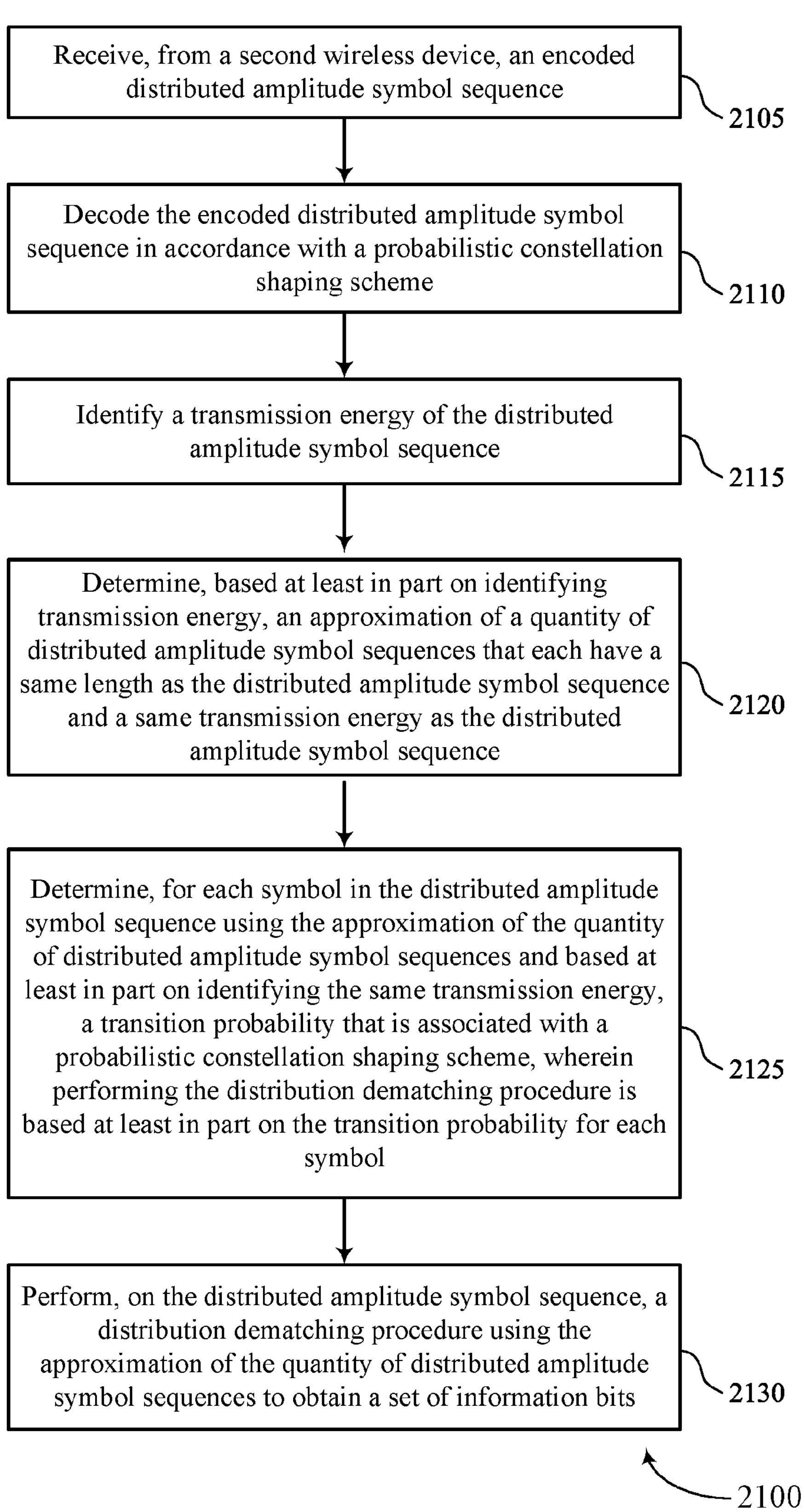

FIG. 21 shows a flowchart illustrating a method 2100 that supports approximations in distribution matching procedures in accordance with one or more aspects of the present disclosure. The operations of the method 2100 may be implemented by a wireless device or its components as described herein. For example, the operations of the method 2100 may be performed by a wireless device as described with reference to FIGS. 1 through 7 and 12 through 15. In some examples, a wireless device may execute a set of instructions to control the functional elements of the wireless device to perform the described functions. Additionally, or alternatively, the wireless device may perform aspects of the described functions using special-purpose hardware.

At 2105, the method may include receiving, from a second wireless device, an encoded distributed amplitude symbol sequence. The operations of 2105 may be performed in accordance with examples as disclosed herein. In some examples, aspects of the operations of 2105 may be performed by a sequence receiver 1425 as described with reference to FIG. 14.

At 2110, the method may include decoding the encoded distributed amplitude symbol sequence in accordance with a probabilistic constellation shaping scheme. The operations of 2110 may be performed in accordance with examples as disclosed herein. In some examples, aspects of the operations of 2110 may be performed by a decoding component 1430 as described with reference to FIG. 14.

At 2115, the method may include identifying a transmission energy of the distributed amplitude symbol sequence. The operations of 2115 may be performed in accordance with examples as disclosed herein. In some examples, aspects of the operations of 2115 may be performed by a transmission energy identifier 1445 as described with reference to FIG. 14.

At 2120, the method may include determining, based on identifying the transmission energy, an approximation of a quantity of distributed amplitude symbol sequences that each have a same length as the distributed amplitude symbol sequence and a same transmission energy as the distributed amplitude symbol sequence. The operations of 2120 may be performed in accordance with examples as disclosed herein. In some examples, aspects of the operations of 2120 may be performed by an approximating component 1435 as described with reference to FIG. 14.

At 2125, the method may include determining, for each symbol in the distributed amplitude symbol sequence using the approximation of the quantity of distributed amplitude symbol sequences and based on identifying the same transmission energy, a transition probability that is associated with a probabilistic constellation shaping scheme, where performing the distribution dematching procedure is based on the transition probability for each symbol. The operations of 2125 may be performed in accordance with examples as disclosed herein. In some examples, aspects of the operations of 2125 may be performed by a transition probability component 1455 as described with reference to FIG. 14.

At 2130, the method may include performing, on the distributed amplitude symbol sequence, a distribution dematching procedure using the approximation of the quantity of distributed amplitude symbol sequences to obtain a set of information bits. The operations of 2130 may be performed in accordance with examples as disclosed herein. In some examples, aspects of the operations of 2130 may be performed by a distribution dematcher 1440 as described with reference to FIG. 14.

The following provides an overview of aspects of the present disclosure:

Aspect 1: A method for wireless communication at a first wireless device, comprising: determining, for a set of information bits, an approximation of a quantity of distributed amplitude symbol sequences that each have a same length and a same transmission energy: performing, on the set of information bits, a distribution matching procedure using the approximation of the quantity of distributed amplitude symbol sequences to obtain a distributed amplitude symbol sequence having the same length and the same transmission energy: encoding the distributed amplitude symbol sequence in accordance with a probabilistic constellation shaping scheme; and transmitting, to a second wireless device, the encoded distributed amplitude symbol sequence.

Aspect 2: The method of aspect 1, further comprising: identifying the same transmission energy based at least in part on the set of information bits, wherein determining the approximation is based at least in part on identifying the same transmission energy.

Aspect 3: The method of aspect 2, wherein performing the distribution matching procedure comprises: identifying, using the approximation of the quantity of distributed amplitude symbol sequences and based at least in part on identifying the same transmission energy, second quantities of each symbol from a set of symbols in the distributed amplitude symbol sequence, wherein the distributed amplitude symbol sequence is obtained based at least in part on identifying the second quantities of each of the set of symbols.

Aspect 4: The method of any of aspects 2 through 3, further comprising: determining, for each symbol in the distributed amplitude symbol sequence using the approximation of the quantity of distributed amplitude symbol sequences and based at least in part on identifying the same transmission energy, a transition probability that is associated with a probabilistic constellation shaping scheme, wherein performing the distribution matching procedure is based at least in part on the transition probability for each symbol.

Aspect 5: The method of aspect 4, wherein determining the transition probability comprises: determining a set of logarithmic approximations of quantities of distributed amplitude symbol sequences, the set of logarithmic approximations comprising at least the approximation of the quantity of distributed amplitude symbol sequences that each have the same length and the same transmission energy; determining a set of exponentiation values each corresponding to one of the set of logarithmic approximations; and normalizing each exponentiation value in the set of exponentiation values.

Aspect 6: The method of any of aspects 1 through 5, wherein each of the quantity of distributed amplitude symbol sequences comprises symbols from a set of symbols; and determining the approximation of the quantity of distributed amplitude symbol sequences is based at least in part on a second quantity of symbols in the set of symbols.

Aspect 7: The method of any of aspects 1 through 6, wherein determining the approximation of the quantity of distributed amplitude symbol sequences comprises: determining a logarithmic approximation of the quantity of distributed amplitude symbol sequences.

Aspect 8: The method of any of aspects 1 through 7, further comprising: identifying, based at least in part on the same length of each of the quantity of distributed amplitude symbol sequences, a portion of the same transmission energy associated with each symbol in the distributed amplitude symbol sequences; and applying a plurality of functions to the identified portion of the same transmission energy, wherein determining the approximation is based at least in part on applying the plurality of functions.

Aspect 9: The method of aspect 8, wherein applying the plurality of functions comprises: applying, to the portion of the same transmission energy, a first function that is scaled by the same length of each of the quantity of distributed amplitude symbol sequences: applying, to the portion of the same transmission energy, a second function that is based at least in part on a logarithmic value of the same length of each of the quantity of distributed amplitude symbol sequences; and applying, to the portion of the same transmission energy, a third function that is scaled by an inverse of the same length of each of the quantity of distributed amplitude symbol sequences.

Aspect 10: The method of any of aspects 8 through 9, further comprising: applying a second function to the same transmission energy, wherein determining the approximation is based at least in part on applying the second function to the same transmission energy.

Aspect 11: The method of any of aspects 8 through 10, wherein applying the plurality of functions comprises: applying, over a first duration, a first function to the portion of the same transmission energy; and applying a second function to the portion of the same transmission energy over a second duration that at least partially overlaps with the first duration.

Aspect 12: The method of any of aspects 1 through 11, further comprising: transmitting, to the second wireless device, signaling indicating one or more parameters associated with approximating the quantity of distributed amplitude symbol sequences, wherein transmitting the encoded distributed amplitude symbol sequence is based at least in part on transmitting the signaling.

Aspect 13: The method of aspect 12, wherein the one or more parameters comprise a modulation order associated with each of the quantity of distributed amplitude symbol sequences, the same transmission energy of each of the quantity of distributed amplitude symbol sequences, or both.

Aspect 14: The method of any of aspects 1 through 13, further comprising: receiving, from the second wireless device, signaling requesting one or more parameters associated with approximating the quantity of distributed amplitude symbol sequences, wherein transmitting the encoded distributed amplitude symbol sequence is based at least in part on receiving the signaling.

Aspect 15: The method of any of aspects 1 through 14, wherein the distributed amplitude symbol sequence comprises a non-uniform probability distribution of amplitudes that is based at least in part on a predefined probability distribution of amplitudes.

Aspect 16: The method of any of aspects 1 through 15, further comprising: performing, in accordance with a probabilistic constellation shaping scheme, a modulation procedure on the encoded distributed amplitude symbol sequence to obtain the codeword, wherein transmitting the codeword is based at least in part on performing the modulation procedure.

Aspect 17: A method for wireless communication at a first wireless device, comprising: receiving, from a second wireless device, an encoded distributed amplitude symbol sequence: decoding the encoded distributed amplitude symbol sequence in accordance with a probabilistic constellation shaping scheme: determining an approximation of a quantity of distributed amplitude symbol sequences that each have a same length as the distributed amplitude symbol sequence and a same transmission energy as the distributed amplitude symbol sequence; and performing, on the distributed amplitude symbol sequence, a distribution dematching procedure using the approximation of the quantity of distributed amplitude symbol sequences to obtain a set of information bits.

Aspect 18: The method of aspect 17, further comprising: identifying the same transmission energy based at least in part on the distributed amplitude symbol sequence, wherein determining the approximation is based at least in part on identifying the same transmission energy.

Aspect 19: The method of aspect 18, wherein performing the distribution dematching procedure comprises: identifying, using the approximation of the quantity of distributed amplitude symbol sequences and based at least in part on identifying the same transmission energy, second quantities of each symbol from a set of symbols in the distributed amplitude symbol sequence, wherein the set of information bits is obtained based at least in part on identifying the second quantities of each of the set of symbols.

Aspect 20: The method of any of aspects 18 through 19, further comprising: determining, for each symbol in the distributed amplitude symbol sequence using the approximation of the quantity of distributed amplitude symbol sequences and based at least in part on identifying the same transmission energy, a transition probability that is associated with a probabilistic constellation shaping scheme, wherein performing the distribution dematching procedure is based at least in part on the transition probability for each symbol.

Aspect 21: The method of aspect 20, wherein determining the transition probability comprises: determining a set of logarithmic approximations of quantities of distributed amplitude symbol sequences, the set of logarithmic approximations comprising at least the approximation of the quantity of distributed amplitude symbol sequences that each have the same length as the distributed amplitude symbol sequence and the same transmission energy as the distributed amplitude symbol sequence; determining a set of exponentiation values each corresponding to one of the set of logarithmic approximations; and normalizing each exponentiation value in the set of exponentiation values.

Aspect 22: The method of any of aspects 17 through 21, wherein each of the quantity of distributed amplitude symbol sequences comprises symbols from a set of symbols; and determining the approximation of the quantity of distributed amplitude symbol sequences is based at least in part on a second quantity of symbols in the set of symbols.

Aspect 23: The method of any of aspects 17 through 22, wherein determining the approximation of the quantity of distributed amplitude symbol sequences comprises: determining a logarithmic approximation of the quantity of distributed amplitude symbol sequences.

Aspect 24: The method of any of aspects 17 through 23, further comprising: identifying, based at least in part on the same length of each of the quantity of distributed amplitude symbol sequences, a portion of the same transmission energy associated with each symbol in the distributed amplitude symbol sequences; and applying a plurality of functions to the identified portion of the same transmission energy, wherein determining the approximation is based at least in part on applying the plurality of functions.

Aspect 25: The method of aspect 24, wherein applying the plurality of functions comprises: applying, to the portion of the same transmission energy, a first function that is scaled by the same length of each of the quantity of distributed amplitude symbol sequences: applying, to the portion of the same transmission energy, a second function that is based at least in part on a logarithmic value of the same length of each of the quantity of distributed amplitude symbol sequences; and applying, to the portion of the same transmission energy, a third function that is iterative and scaled by an inverse of the same length of each of the quantity of distributed amplitude symbol sequences.

Aspect 26: The method of any of aspects 24 through 25, further comprising: applying a second function to the same transmission energy, wherein determining the approximation is based at least in part on applying the second function to the same transmission energy.

Aspect 27: The method of any of aspects 24 through 26, wherein applying the plurality of functions comprises:

applying, over a first duration, a first function to the portion of the same transmission energy; and applying a second function to the portion of the same transmission energy over a second duration that at least partially overlaps with the first duration.

Aspect 28: The method of any of aspects 17 through 27, further comprising: receiving, from the second wireless device, signaling indicating one or more parameters associated with approximating the quantity of distributed amplitude symbol sequences, wherein receiving the encoded distributed amplitude symbol sequence is based at least in part on receiving the signaling.

Aspect 29: The method of aspect 28, wherein the one or more parameters comprise a modulation order associated with each of the quantity of distributed amplitude symbol sequences, the same transmission energy of each of the quantity of distributed amplitude symbol sequences, or both.

Aspect 30: The method of any of aspects 17 through 29, further comprising: transmitting, to the second wireless device, signaling requesting one or more parameters associated with approximating the quantity of distributed amplitude symbol sequences, wherein receiving the encoded distributed amplitude symbol sequence is based at least in part on transmitting the signaling.

Aspect 31: The method of any of aspects 17 through 30, wherein the distributed amplitude symbol sequence comprises a non-uniform probability distribution of amplitudes that is based at least in part on a predefined probability distribution of amplitudes.

Aspect 32: An apparatus for wireless communication at a first wireless device, comprising a processor: memory coupled with the processor; and instructions stored in the memory and executable by the processor to cause the apparatus to perform a method of any of aspects 1 through 16.

Aspect 33: An apparatus for wireless communication at a first wireless device, comprising at least one means for performing a method of any of aspects 1 through 16.

Aspect 34: A non-transitory computer-readable medium storing code for wireless communication at a first wireless device, the code comprising instructions executable by a processor to perform a method of any of aspects 1 through 16.

Aspect 35: An apparatus for wireless communication at a first wireless device, comprising a processor: memory coupled with the processor; and instructions stored in the memory and executable by the processor to cause the apparatus to perform a method of any of aspects 17 through 31.

Aspect 36: An apparatus for wireless communication at a first wireless device, comprising at least one means for performing a method of any of aspects 17 through 31.

Aspect 37: A non-transitory computer-readable medium storing code for wireless communication at a first wireless device, the code comprising instructions executable by a processor to perform a method of any of aspects 17 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:

determining, for a set of information bits, an approximation of a quantity of distributed amplitude symbol sequences that each have a same length and a same transmission energy;

performing, on the set of information bits, a distribution matching procedure using the approximation of the quantity of distributed amplitude symbol sequences to obtain a distributed amplitude symbol sequence having the same length and the same transmission energy;

encoding the distributed amplitude symbol sequence in accordance with a probabilistic constellation shaping scheme; and transmitting, to a second wireless device, the encoded distributed amplitude symbol sequence.

2. The method of claim 1, further comprising:

identifying the same transmission energy based at least in part on the set of information bits, wherein determining the approximation is based at least in part on identifying the same transmission energy.

3. The method of claim 2, wherein performing the distribution matching procedure comprises:

identifying, using the approximation of the quantity of distributed amplitude symbol sequences and based at least in part on identifying the same transmission energy, second quantities of each symbol from a set of symbols in the distributed amplitude symbol sequence, wherein the distributed amplitude symbol sequence is obtained based at least in part on identifying the second quantities of each of the set of symbols.

4. The method of claim 2, further comprising:

determining, for each symbol in the distributed amplitude symbol sequence using the approximation of the quantity of distributed amplitude symbol sequences and based at least in part on identifying the same transmission energy, a transition probability that is associated with the probabilistic constellation shaping scheme, wherein performing the distribution matching procedure is based at least in part on the transition probability for each symbol.

5. The method of claim 4, wherein determining the transition probability comprises:

determining a set of logarithmic approximations of quantities of distributed amplitude symbol sequences, the set of logarithmic approximations comprising at least the approximation of the quantity of distributed amplitude symbol sequences that each have the same length and the same transmission energy;

determining a set of exponentiation values each corresponding to one of the set of logarithmic approximations; and normalizing each exponentiation value in the set of exponentiation values.

6. The method of claim 1, wherein:

each of the quantity of distributed amplitude symbol sequences comprises symbols from a set of symbols; and determining the approximation of the quantity of distributed amplitude symbol sequences is based at least in part on a second quantity of symbols in the set of symbols.

7. The method of claim 1, wherein determining the approximation of the quantity of distributed amplitude symbol sequences comprises:

determining a logarithmic approximation of the quantity of distributed amplitude symbol sequences.

8. The method of claim 1, further comprising:

identifying, based at least in part on the same length of each of the quantity of distributed amplitude symbol sequences, a portion of the same transmission energy associated with each symbol in the distributed amplitude symbol sequences; and applying a plurality of functions to the identified portion of the same transmission energy, wherein determining the approximation is based at least in part on applying the plurality of functions.

9. The method of claim 8, wherein applying the plurality of functions comprises:

applying, to the identified portion of the same transmission energy, a first function that is scaled by the same length of each of the quantity of distributed amplitude symbol sequences;

applying, to the identified portion of the same transmission energy, a second function that is based at least in part on a logarithmic value of the same length of each of the quantity of distributed amplitude symbol sequences; and applying, to the identified portion of the same transmission energy, a third function that is scaled by an inverse of the same length of each of the quantity of distributed amplitude symbol sequences.

10. The method of claim 8, further comprising:

applying a second function to the identified portion of the same transmission energy, wherein determining the approximation is based at least in part on applying the second function to the identified portion of the same transmission energy.

11. The method of claim 8, wherein applying the plurality of functions comprises:

applying, over a first duration, a first function to the identified portion of the same transmission energy; and applying a second function to the identified portion of the same transmission energy over a second duration that at least partially overlaps with the first duration.

12. The method of claim 1, further comprising:

transmitting, to the second wireless device, signaling indicating one or more parameters associated with the approximation of the quantity of distributed amplitude symbol sequences, wherein transmitting the encoded distributed amplitude symbol sequence is based at least in part on transmitting the signaling.

13. The method of claim 12, wherein the one or more parameters comprise a modulation order associated with each of the quantity of distributed amplitude symbol sequences, the same transmission energy of each of the quantity of distributed amplitude symbol sequences, or both.

14. The method of claim 1, further comprising:

receiving, from the second wireless device, signaling requesting one or more parameters associated with approximating the quantity of distributed amplitude symbol sequences, wherein transmitting the encoded distributed amplitude symbol sequence is based at least in part on receiving the signaling.

15. The method of claim 1, wherein the distributed amplitude symbol sequence comprises a non-uniform probability distribution of amplitudes that is based at least in part on a predefined probability distribution of amplitudes.

16. The method of claim 1, further comprising:

performing, in accordance with the probabilistic constellation shaping scheme, a modulation procedure on the encoded distributed amplitude symbol sequence to obtain a codeword, wherein transmitting the encoded distributed amplitude symbol sequence is based at least in part on performing the modulation procedure.

17. An apparatus for wireless communication at a first wireless device, comprising:

one or more processors;

memory coupled with the one or more processors; and instructions stored in the memory and executable by the one or more processors to cause the apparatus to:

determine, for a set of information bits, an approximation of a quantity of distributed amplitude symbol sequences that each have a same length and a same transmission energy;

perform, on the set of information bits, a distribution matching procedure using the approximation of the quantity of distributed amplitude symbol sequences to obtain a distributed amplitude symbol sequence having the same length and the same transmission energy;

encode the distributed amplitude symbol sequence in accordance with a probabilistic constellation shaping scheme; and transmit, to a second wireless device, the encoded distributed amplitude symbol sequence.

18. The apparatus of claim 17, wherein the instructions are further executable by the one or more processors to cause the apparatus to:

identify the same transmission energy based at least in part on the set of information bits, wherein determining the approximation is based at least in part on identifying the same transmission energy.

19. The apparatus of claim 18, wherein the instructions to perform the distribution matching procedure are executable by the one or more processors to cause the apparatus to:

identify, using the approximation of the quantity of distributed amplitude symbol sequences and based at least in part on identifying the same transmission energy, second quantities of each symbol from a set of symbols in the distributed amplitude symbol sequence, wherein the distributed amplitude symbol sequence is obtained based at least in part on identifying the second quantities of each of the set of symbols.

20. The apparatus of claim 18, wherein the instructions are further executable by the one or more processors to cause the apparatus to:

determine, for each symbol in the distributed amplitude symbol sequence using the approximation of the quantity of distributed amplitude symbol sequences and based at least in part on identifying the same transmission energy, a transition probability that is associated with the probabilistic constellation shaping scheme, wherein performing the distribution matching procedure is based at least in part on the transition probability for each symbol.

21. The apparatus of claim 20, wherein the instructions to determine the transition probability are executable by the one or more processors to cause the apparatus to:

determine a set of logarithmic approximations of quantities of distributed amplitude symbol sequences, the set of logarithmic approximations comprising at least the approximation of the quantity of distributed amplitude symbol sequences that each have the same length and the same transmission energy;

determine a set of exponentiation values each corresponding to one of the set of logarithmic approximations; and normalize each exponentiation value in the set of exponentiation values.

22. The apparatus of claim 17, wherein:

each of the quantity of distributed amplitude symbol sequences comprises symbols from a set of symbols; and determining the approximation of the quantity of distributed amplitude symbol sequences is based at least in part on a second quantity of symbols in the set of symbols.

23. The apparatus of claim 17, wherein the instructions to determine the approximation of the quantity of distributed amplitude symbol sequences are executable by the one or more processors to cause the apparatus to:

determine a logarithmic approximation of the quantity of distributed amplitude symbol sequences.

24. The apparatus of claim 17, wherein the instructions are further executable by the one or more processors to cause the apparatus to:

identify, based at least in part on the same length of each of the quantity of distributed amplitude symbol sequences, a portion of the same transmission energy associated with each symbol in the distributed amplitude symbol sequences; and apply a plurality of functions to the identified portion of the same transmission energy, wherein determining the approximation is based at least in part on applying the plurality of functions.

25. The apparatus of claim 24, wherein the instructions to apply the plurality of functions are executable by the one or more processors to cause the apparatus to:

apply, to the identified portion of the same transmission energy, a first function that is scaled by the same length of each of the quantity of distributed amplitude symbol sequences;

apply, to the identified portion of the same transmission energy, a second function that is based at least in part on a logarithmic value of the same length of each of the quantity of distributed amplitude symbol sequences; and apply, to the identified portion of the same transmission energy, a third function that is scaled by an inverse of the same length of each of the quantity of distributed amplitude symbol sequences.

26. The apparatus of claim 24, wherein the instructions are further executable by the one or more processors to cause the apparatus to:

apply a second function to the identified portion of the same transmission energy, wherein determining the approximation is based at least in part on applying the second function to the identified portion of the same transmission energy.

27. The apparatus of claim 24, wherein the instructions to apply the plurality of functions are executable by the one or more processors to cause the apparatus to:

apply, over a first duration, a first function to the identified portion of the same transmission energy; and apply a second function to the identified portion of the same transmission energy over a second duration that at least partially overlaps with the first duration.

28. The apparatus of claim 17, wherein the instructions are further executable by the one or more processors to cause the apparatus to:

transmit, to the second wireless device, signaling indicating one or more parameters associated with the approximation of the quantity of distributed amplitude symbol sequences, wherein transmitting the encoded distributed amplitude symbol sequence is based at least in part on transmitting the signaling.

29. The apparatus of claim 28, wherein the one or more parameters comprise a modulation order associated with each of the quantity of distributed amplitude symbol sequences, the same transmission energy of each of the quantity of distributed amplitude symbol sequences, or both.

30. A non-transitory computer-readable medium storing code for wireless communications by a first wireless device, the code comprising instructions executable by one or more processors to:

determine, for a set of information bits, an approximation of a quantity of distributed amplitude symbol sequences that each have a same length and a same transmission energy;

perform, on the set of information bits, a distribution matching procedure using the approximation of the quantity of distributed amplitude symbol sequences to obtain a distributed amplitude symbol sequence having the same length and the same transmission energy;

encode the distributed amplitude symbol sequence in accordance with a probabilistic constellation shaping scheme; and transmit, to a second wireless device, the encoded distributed amplitude symbol sequence.

* * * * *